US011511373B2

(12) United States Patent
Penny et al.

(10) Patent No.: US 11,511,373 B2
(45) Date of Patent: Nov. 29, 2022

(54) SENSING AND CONTROL OF ADDITIVE MANUFACTURING PROCESSES

(71) Applicant: Massachusetts Institute of Technology, Cambridge, MA (US)

(72) Inventors: Ryan Wade Penny, Cambridge, MA (US); Anastasios John Hart, Waban, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 698 days.

(21) Appl. No.: 16/114,188

(22) Filed: Aug. 27, 2018

(65) Prior Publication Data
US 2019/0118300 A1    Apr. 25, 2019

Related U.S. Application Data

(60) Provisional application No. 62/550,209, filed on Aug. 25, 2017.

(51) Int. Cl.
*B23K 26/342* (2014.01)
*B33Y 10/00* (2015.01)
(Continued)

(52) U.S. Cl.
CPC .......... *B23K 26/342* (2015.10); *B23K 26/032* (2013.01); *B23K 26/0622* (2015.10);
(Continued)

(58) Field of Classification Search
CPC ......... B33Y 10/00; B33Y 50/02; B33Y 30/00; B33Y 40/00; B33Y 70/00; B33Y 80/00;
(Continued)

(56) References Cited

U.S. PATENT DOCUMENTS

2002/0035454 A1    3/2002  Ingram et al.
2004/0200816 A1   10/2004  Chung et al.
(Continued)

FOREIGN PATENT DOCUMENTS

WO   2015/112726 A1   7/2015
WO   2016/081651 A1   5/2016
WO   2016/108560 A1   7/2016

OTHER PUBLICATIONS

[No Atuhor Listed] GATS Inc. Blackbody Calculator. Sep. 2015. 1 Page. Retrieved on Feb. 11, 2019 from <http://www.spectralcalc.com/blackbody_calculator/blackbody.php>.
(Continued)

*Primary Examiner* — Ibrahime A Abraham
*Assistant Examiner* — Chris Q Liu
(74) *Attorney, Agent, or Firm* — Barnes & Thornburg LLP

(57) ABSTRACT

Systems, devices, and methods for additive manufacturing are provided that allow for components being manufactured to be assessed during the printing process. As a result, changes to a print plan can be considered, made, and implemented during the printing process. More particularly, in exemplary embodiments, a spectrometer is operated while a component is being printed to measure one or more parameters associated with one or more layers of the component being printed. The measured parameter(s) are then relied upon to determine if any changes are needed to the way printing is occurring, and if such changes are desirable, the system is able to implement such changes during the printing process. By way of non-limiting examples, printed material in one or more layers may be reheated to alter the printed component, such as to remove defects identified by the spectrometer data. A variety of systems, devices, and
(Continued)

methods for performing real-time sensing and control of an additive manufacturing process are also provided.

12 Claims, 6 Drawing Sheets

(51) Int. Cl.

| | | |
|---|---|---|
| *B33Y 30/00* | (2015.01) | |
| *B33Y 50/02* | (2015.01) | |
| *B23K 26/70* | (2014.01) | |
| *G01N 21/95* | (2006.01) | |
| *B23K 31/12* | (2006.01) | |
| *B23K 26/03* | (2006.01) | |
| *B23K 26/06* | (2014.01) | |
| *B23K 26/073* | (2006.01) | |
| *B23K 26/082* | (2014.01) | |
| *B23K 26/0622* | (2014.01) | |
| *B29C 64/30* | (2017.01) | |
| *B29C 64/393* | (2017.01) | |
| *G01N 21/84* | (2006.01) | |
| *G01N 21/94* | (2006.01) | |

(52) U.S. Cl.
CPC ........ *B23K 26/0626* (2013.01); *B23K 26/073* (2013.01); *B23K 26/0821* (2015.10); *B23K 26/70* (2015.10); *B29C 64/30* (2017.08); *B29C 64/393* (2017.08); *B33Y 10/00* (2014.12); *B33Y 30/00* (2014.12); *B33Y 50/02* (2014.12); *B23K 26/702* (2015.10); *B23K 31/125* (2013.01); *G01N 21/8422* (2013.01); *G01N 21/94* (2013.01); *G01N 21/95* (2013.01)

(58) Field of Classification Search
CPC .. B23K 15/0013; B23K 26/03; B23K 26/034; B23K 26/0344; B23K 26/04; B23K 26/0869; B23K 26/123; B23K 26/142; B23K 26/144; B23K 26/1462; B23K 26/32; B23K 26/34; B23K 26/342; B23K 26/361; B23K 26/702; B23K 31/125; B23K 35/0244; B23K 37/06; B23K 26/032
USPC .............................. 219/76.1, 121.66, 121.85
See application file for complete search history.

(56) References Cited

U.S. PATENT DOCUMENTS

| | | |
|---|---|---|
| 2008/0223832 A1 | 9/2008 | Song et al. |
| 2015/0076128 A1 | 3/2015 | Marchione et al. |
| 2015/0268099 A1 | 9/2015 | Craig et al. |
| 2015/0375456 A1 | 12/2015 | Cheverton et al. |
| 2016/0023403 A1 | 1/2016 | Ramos et al. |
| 2016/0052086 A1 | 2/2016 | Mazumder et al. |
| 2016/0114431 A1 | 4/2016 | Cheverton et al. |
| 2016/0236414 A1 | 8/2016 | Reese et al. |
| 2017/0059408 A1 | 3/2017 | Korner et al. |
| 2017/0120337 A1 | 5/2017 | Kanko et al. |
| 2017/0165754 A1 | 6/2017 | Buller et al. |

OTHER PUBLICATIONS

Everton, S.K., et al., Review of in-situ process monitoring and in-situ metrology for metal additive manufacturing. Materials & Design. Apr. 2016;95:431-445.

Frazier, W.E., Metal additive manufacturing: A Review. Journal of Materials Engineering & Performance (JMEPEG). 2014;23(6):1917-1928.

International Search Report and Written Opinion for Application No. PCT/US2018/048205, dated Nov. 7, 2018 (21 Pages).

Knowles, C.R., et al.. The effect of heat treatment on the residual stress levels within direct metal laser sintered Ti-6AI-4V as measured using the hole-drilling strain gauge method. Proceedings of the 13th International RAPDASA Conference, 2012, 10 Pages.

Krauss, H., et al., Thermography for Monitoring the Selective Laser Melting Process. Proceedings of the 23rd Annual International Solid Freeform Fabrication Symposium. 2012, pp. 999-1014.

Krauss, H., et al., Layerwise Monitoring of the Selective Laser Melting Process by Thermography. 8th International Conference on Photonic Technologies LANE 2014. Physics Procedia. 2014;56:64-71.

Li, Z.L., et al., Land surface emissivity retrieval from satellite data. International Journal of Remote Sensing. 2013;34(9-10):3084-3127.

Planck, M., et al., The Theory of Heat Radiation. P. Blaskiston's Son & Co., Philadelphia, PA, 1914, 287 Pages.

Seifi, M., et al., Overview of Materials Qualification Needs for Metal Additive Manufacturing. JOM: The Journal of the Minerals, Metals, & Materials Society (TMS). 2016;68(3):747-764.

Touloukian, Y.S., et al., Thermophysical properties of matter—the TPRC data series. vol. 7. Thermal radiative properties—metallic elements and alloys. In Thermophysical and Electronic Properties Information Center, Data Book, 1970, 1599 Pages.

Del Campo, L., et al.. Emissivity measurements on aeronautical alloys. Journal of Alloys and Compounds. Jan. 21, 2010;489(2):482-487.

Glicksman, M.E., Principles of Solidification: An Introduction to Modern Casting and Crystal Growth Concepts. Springer-Verlag, New York, 2011, 520 Pages.

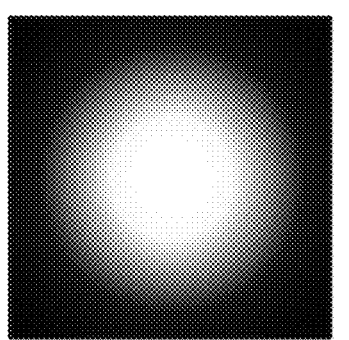
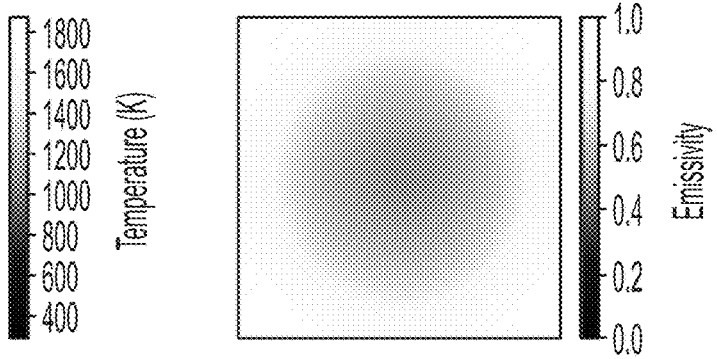
FIG. 4A  Melt Pool Temperature
FIG. 4B  Typical Emissivity Distribution
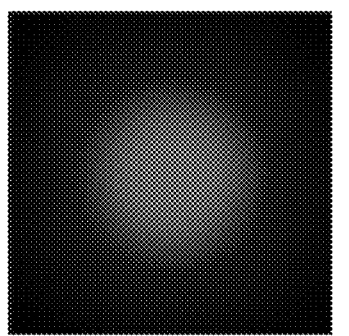
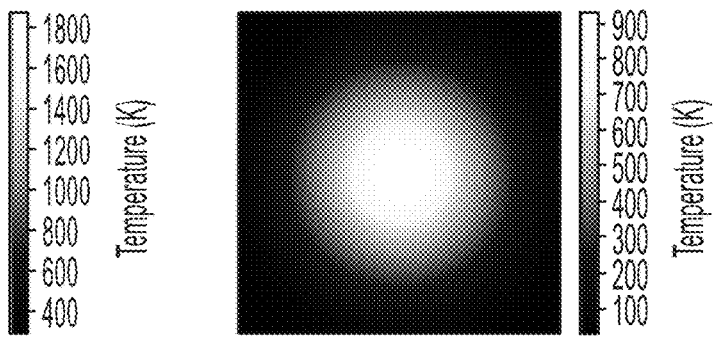
FIG. 4C  Measured Temperature without TE Separation
FIG. 4D  Error in Measurement
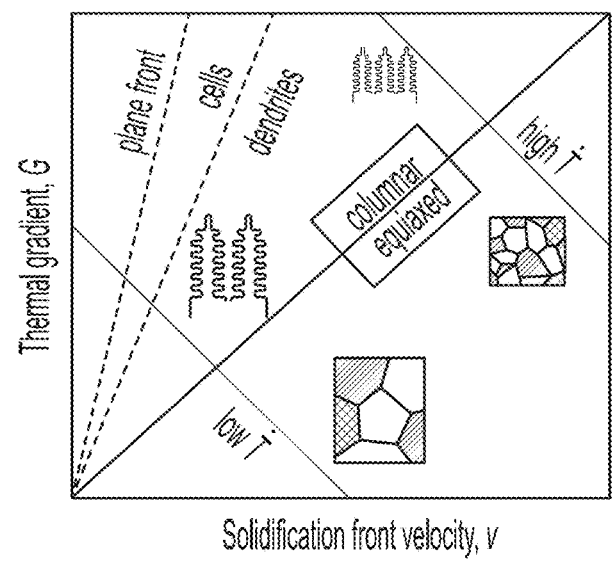
FIG. 5

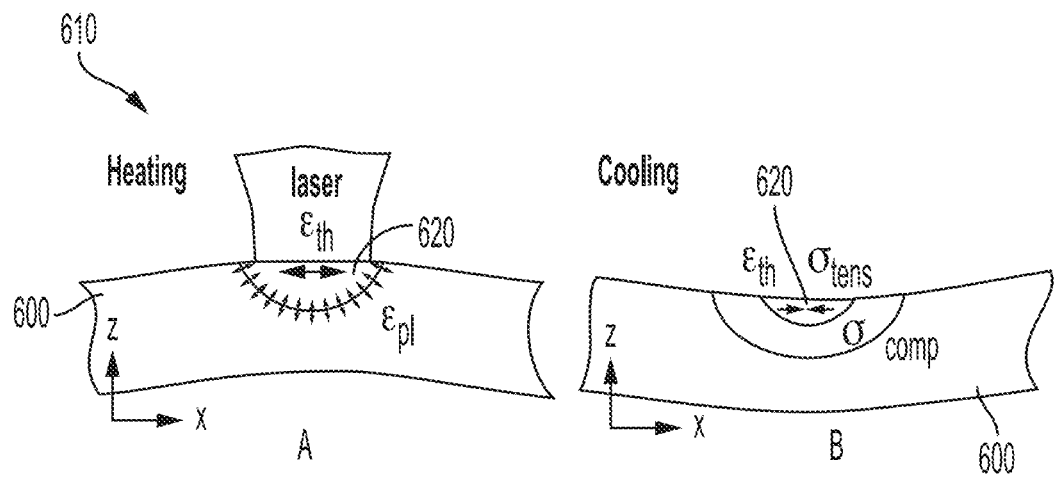
FIG. 6
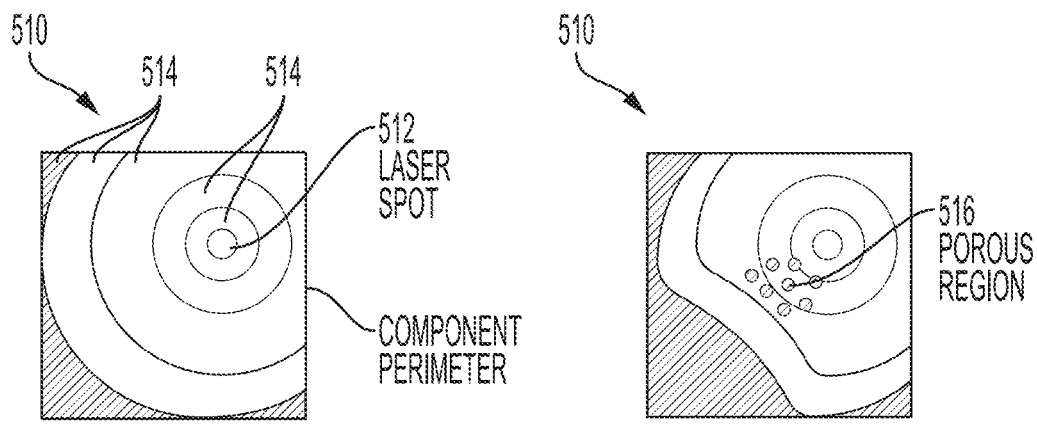
FIG. 7A
FIG. 7B
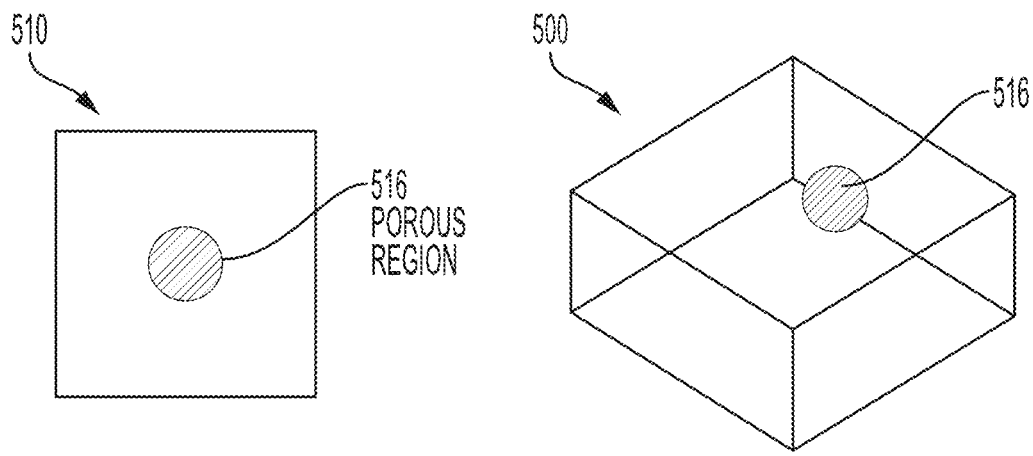
FIG. 7C
FIG. 7D

SENSING AND CONTROL OF ADDITIVE MANUFACTURING PROCESSES

CROSS REFERENCE TO RELATED APPLICATION

The present application claims priority to and the benefit of U.S. Provisional Application No. 62/550,209, filed Aug. 25, 2017, and titled "Sensing and Control of Additive Manufacturing Processes," the contents of which his incorporated herein by reference in its entirety.

GOVERNMENT RIGHTS

This invention was made with Government support under Grant No. N000189586 awarded by the Department of Energy. The Government has certain rights in the invention.

FIELD

The present disclosure relates to systems, devices, and methods for additive manufacturing, and more particularly relates to providing sensing and control during the course of printing a three-dimensional object, such as by obtaining accurate temperature readings of material(s) involved in printing prior to, during, and/or after depositing the material(s) during a manufacturing process.

BACKGROUND

Additive Manufacturing (AM) has become a central technology for rapid prototyping and short run manufacturing. One advantage of AM lies in its ability to create geometries inaccessible with conventional manufacturing techniques. This immense flexibility is challenged, however, by problems related to, by way of non-limiting examples, defects, surface roughness, and residual stress, which can limit use of AM-printed objects in high-value or mission critical applications. This may only be overcome by fabricating parts that meet stringent qualification standards, e.g., for use in aerospace, medicine, and energy generation applications. Presently, high performance AM parts are inspected after fabrication on the part-by-part basis using conventional metrology and non-destructive testing (NDT) methods. It can often take between about four hours to about eight hours per part to confirm its accuracy before it can be used. Further, to the extent a printed part fails inspection, the whole part may have to be disposed of, and it can take more time, effort, energy, and money, to go back and start the printing from the beginning. However, costly evaluation is necessary due to the extreme and poorly understood process variability present across all practical AM technologies. Components produced on the same machine, using the same build parameters, often perform differently in service. As a result, it has so far proven difficult, if not impossible, to certify both an AM component design and process for production of high quality parts.

Accordingly, there is a need for AM systems, devices, and methods that allow for an AM component to be inspected, certified, and/or verified in real time, i.e., while the AM component is being manufactured. This should allow for components, and particularly high quality parts having high-value and/or mission critical applications, to be more accurately and efficiently printed, without wasting materials and parts because the components failed some inspection, certification, or verification at some later point in time.

SUMMARY

The systems, devices, and methods described herein address the problems of process control (PC) and quality control (QC) in AM, specifically through in-situ, spectrally and spatially resolved interrogation of the process. As provided for in the present disclosure, a time-varying spectral signature of a component may be used to modulate process parameters, such signatures including a rate of energy deposition, a scan rate, and infill scan patterns, which in turn can be used to affect parameters such as finished component accuracy, microstructure, residual stress distribution, and surface finish. This closed-loop process control provides a means for reducing the variability in the properties of the resulting components. Moreover, in-situ monitoring of the build process provides a means for quality assessment of the completed parts. As provided for herein, parameters such as porosity, surface roughness, melt pool contamination, and anomalous temperature history can all be quantified and controlled in conjunction with the disclosed systems, devices, and methods to provide better PC and QC. Accurate time-temperature data also can enable more sophisticated QC methods, such as a novel implementation of thermal diffusivity tomography. Still further, there are distinct advantages to QC measures that may be performed in a layerwise fashion as provided for in the present disclosure. For example, minor defects can be remediated by localized remelting, complex interior features may be interrogated before they become inaccessible, and the build may even be terminated prematurely if irrecoverable defects are found. Such measures are not necessarily temperature-dependent, and, in view of the present disclosure and the knowledge of a person skilled in the art, other advantages can be realized in view of the provided for QC measures, whether those measures involve temperature measurements, spectrally resolved radiance measurements, or otherwise.

Practically implementing these sensing technologies typically involves non-trivial integration of high-speed, spectrally resolved optical sensing, processing to extract actionable information from the generated data, data processing to determine the desired process parameters, and/or an interface by which this control is managed. A potential, non-limiting embodiment is illustrated in FIG. 1 below, in which an imaging spectrometer is used to interrogate a selective laser melting (SLM) additive manufacturing process. Such a spectrometer device natively produces hypercubes, providing data as a function of both spatial position in the scene (X and Y) and a third dimension that resolves wavelength ($\lambda$). These data may be processed to extract other data products, such as temperature profiles, which may be used for direct control of an AM process.

In one exemplary embodiment of a system for manufacturing a three-dimensional object, the system includes an additive manufacturing (AM) printer, an imaging spectrometer, and a controller. The AM printer is configured to fuse or deposit a plurality of layers to manufacture a three-dimensional (3D) object according to a build plan (also referred to as a print plan). The imaging spectrometer is configured to measure one or more parameters while the plurality of layers are fused or deposited by the AM printer, as well as transmit one or more signals that correlate to the measured parameter(s). The controller is configured to receive the signals that correlate to the measured parameter(s), determine if any changes to the build plan are desirable in view of the measured parameter(s), and, if changes are determined to be desirable, adjust the build plan in view of the measured parameter(s) while the AM printer is still in the process of manufacturing the 3D object.

The build plan can involve a number of actions, steps, and parameters associated with performing such actions and steps. By way of non-limiting example, the build plan can include one or more of a scan speed, a laser power, a laser scan path, a spot size, and a rate of heating or cooling a material(s) that is fused or deposited in one or more layers of the plurality of layers being fused or deposited by the AM printer. In such embodiments, an adjustment of the build plan by the controller includes at least one of adjusting the scan speed, the laser power, the toolpath, the spot size, or the rate of heating or cooling a material(s) being fused or deposited in one or more layers of the plurality of layers in response to the measured parameter(s).

Any number of parameters can be measured. By way of non-limiting example, such parameters can include one or more of a temperature distribution, emissivity, spectrally resolved radiance measurements, band ratios, radiation transport characteristics, and a melt pool shape. Adjustment made by the controller can then be based on the parameter(s) that is measured. The controller can be configured to determine statistical moments of the parameter(s), such as averages or variances, along spatial, temporal, or spectral dimensions of the recorded data. For example, mean melt pool temperature may be used to adjust laser power, and the variance of that temperature over time provides a metric for process stability. In alternate embodiments, the controller can be configured to extract at least one of spatial derivatives, temporal derivatives, or spectral derivatives and process such derivative(s) to generate a quality control assessment and/or process control signal. For example, measured thermal gradients across the melt pool enable one to optimally tune laser power, spot size, and energy profile (energy delivered as a function of location within the laser spot, which may incorporate Gaussian, quasi-Gaussian, top-hat, or donut character, by way of non-limiting examples). At the boundary of a component, dimensional accuracy may be improved by maximizing the spatial thermal gradient, such that the edge of the part is sharply defined. Conversely, a more diffuse shape for the interior of a component may help improve fusion of molten material to the component. Gradient is used herein to describe a profile or derivative of a variable along one or more dimensions of a dataset, regardless of the dimensions thereof. For example, the total derivative of a temperature with respect to X and Y position, and the 1D derivative of center melt pool temperature as a function of time both comprise a gradient.

The controller can be configured to perform a variety of other functions, separate from, or in conjunction with, the determining and adjusting functions. By way of non-limiting example, the controller can be configured to perform temperature-emissivity separation of the measured parameter(s), and the measured parameter(s) can include one or more spectrally resolved radiance measurements. In some such embodiments, the spectrally resolved radiance measurement(s) can include a first spectrally resolved radiance measurement and a second spectrally resolved radiance measurement, and the temperature-emissivity separation can be performed using a two temperature method. In some other such embodiments, the measured parameter(s) can include a spectrally resolved radiance measurement, an in-band emissivity of the 3D object can be designated as an arbitrary value that is identical for a single pair of spectral bands that include the spectrally resolved radiance measurement, and the temperature-emissivity separation can be performed using a grey body method.

The measured parameter(s) can include emissivity data. In some such embodiments, the controller can be configured to qualify the dimensions of the 3D object in view of the emissivity data. Alternatively, or additionally, the measured parameter(s) can include anomalous spectral features. In some such embodiments, the controller can be configured to assess parameters of a melt pool of the AM printer in view of the anomalous spectral features.

The measured parameter(s) can be sufficient to allow the controller to detect one or more defects in the plurality of fused or deposited layers. In such instances, the controller can be configured to adjust the build plan such that at least one defect of the one or more defects is remediated by the controller adjusting the build plan to allow for a portion of the plurality of fused or deposited layers to remelt material included as part of the portion of the plurality of fused or deposited layers. In some such embodiments, controller being configured to perform at least one of the following: use one or more recovered control signals to quantify defect morphology; deliver extra feedstock to the defect location; calculate optimal scan parameters in view of defect and feedstock properties; or apply one or more scan parameters to the build plan.

Other examples of adjustments to the build plan that can be made by the controller include at least one of: (1) altering one or more laser scan parameters of the AM printer to achieve at least one of a desirable thermal gradient or a time derivative temperature within a defined region of the three-dimensional object (i.e., the build surface); (2) selectively re-heating at least a portion of at least one layer of the plurality of layers to achieve at least one of a desirable thermal profile, thermal gradient, or a time derivative of temperature within a defined region of the three-dimensional object (i.e., the build surface); and (3) adjusting a temperature of at least one of a melt pool of the AM printer or at least a portion of at least one layer of the plurality of layers to alter at least one of a microstructure, residual stress, or surface roughness of a defined region of the 3D object. Achieving a desirable thermal profile can be as simple as heating a portion of the layer to a target temperature, i.e., melting it. Still further non-limiting examples include adjusting an energy profile of a first layer of the AM printer to maintain a desired temperature gradient about a portion of one or more lasers of the plurality of lasers that is melted by a second laser of the AM printer.

The controller can be configured to adjust an energy profile of one or more process lasers of the AM printer using at least one of adaptive feed-forward control or feedback control. Extracted control signals are able to be the input to such a controller to adjust process inputs. Given the repetitive nature of layerwise AM processes, process control may occur on several timescales. At one extreme, machine parameters can be updated on-the-fly, with the aim of mitigating process variations. For example, laser energy may be tuned in response to actual melt pool temperature and size as it fuses the material, thereby reducing the degree to which process instabilities manifest as defects in the completed component. A typical scan speed for SLM processing can be on the order of about 250 millimeters per second, and melt pool diameters can often be on the order of about 100 µm. In such instances, sampling the melt pool as it moves $1/10^{th}$ of this characteristic dimension can require sampling at about 25 kHz. At this rate, modern processors can be capable of performing 100 million floating point operations between subsequent frames, or sufficiently rapidly to extract many control signals of interest and update machine parameters prior to the next sample. Issues concerning data transfer latency at these speeds can be optimally addressed by directly coupling the sensor to the processor; this is commonly seen in state-of-the-art high-speed imaging equipment, in which an image sensor, a field-programmable gate array (FPGA), and memory are directly coupled.

Updates to machine parameters also may be performed at longer timescales, either in addition to the methods discussed in the preceding paragraph, or separately. In some instances, data recorded during a previous laser pulse(s), scan vector(s), layer(s), and/or entire components can be used to update process parameters for material to be fused. For example, consider this process implemented vector-wise for the first overhanging layer of a "T" shaped component, in which the laser is swept from left to right in parallel passes over the entire length of the component. The first scan vector may show optimal process parameters for the supported region on the left, however, this energy density can result in overheating of the unsupported region if performed without the real-time feedback mechanism of the preceding paragraph. However, after sensing the region of overheating along this first vector, the controller can compensate by reducing laser power for the corresponding segment of the second pass that lies adjacent to the overhanging regions of the first. More generally, data collected for any region near the vector to be scanned may be used to update process parameters. If a region under the vector to be scanned features a lack-of-fusion type defect, a capable controller may increase laser power or decrease scan speed for the vector segment over this region, thereby remelting the lower layer and eliminating the defect. Similarly, this can be anticipated in advance of the scan, for example, by analysis of the geometry of the component to determine an initial set of process parameters, and the real-time control can further refine the process parameters to achieve the target performance.

Further, this process, and those related thereto or otherwise derivable from the present disclosure, may be adapted to more complex scan strategies. For example, many SLM parts can be fabricated using an island pattern, in which the interior of the component is scanned in a checkerboard-like pattern. Each tile can typically be between about 2 millimeters and about 10 millimeters square, scanned, for example, as a series of parallel lines. In this case, data from neighboring tiles, including those in the previous layer, may be used to adjust process parameters. Moreover, because each tile can be comprised of a series of parallel lines, the process may also leverage data from adjoining scan lines, as outlined above. As a further alternative, some components can be fabricated using a series of pulses at discrete points instead of sweeping a continuously operating laser over the build material. The process of the present disclosure proceeds in much the same case in this condition; process measurements for neighboring points, again including those in the preceding layer, can be fed-forward to more optimally set process parameters for subsequent points.

Still further, this process, and those related thereto or otherwise derivable from the present disclosure, can operate off-line. In such cases, multispectral radiographic data can be collected for the fabrication of a first component, and can be used to update process parameters for the fabrication of a second component. Returning again to the "T" component example, overheating of the overhanging region can be observed for the first component. Altering the laser power in the machine code for the second fabricated component in this region can result in superior surface finish and form accuracy. Operating on this timescale may have the benefit of immunity to processing latency, and effectiveness in mitigating systematic problems, such as those arising from component geometry and machine misalignment or miscalibration. However, unlike the methods above, such a system may not effectively address variations in part quality arising from stochastic variability in the SLM process, nor may it be effective to improve the quality of components produced individually.

In some such instances, the controller can be configured to adjust the energy profile of the process laser(s) of the AM printer using previously recorded process data. Alternatively, or additionally, the controller can be configured to adjust the energy profile of the process laser(s) of the AM printer using a CAD code and/or analysis of the corresponding machine code to generate control signals. Returning to an overhanging feature example, the controller can decrease laser power at the transition from printing above previously-solidified material to printing above powder to compensate for less effective thermal transfer out of the melt pool, with fine adjustment being able to be provided via feedback control. In some embodiments, the controller can be configured to terminate manufacture of the 3D object prior to completion of the build plan in response to a defect detected by way of the measured parameter(s).

In one exemplary method, the method includes depositing or fusing one or more layers of a plurality of layers of a three-dimensional (3D) object, with the depositing or fusing being performed by an additive manufacturing (AM) printer. The method further includes measuring one or more parameters associated with the one or more layers using an imaging spectrometer, with the measuring occurring prior to all of the layers of the plurality of layers of the 3D object being deposited or fused. The measured parameter(s) are communicated to a controller for processing, and such parameter(s) are processed using the controller to determine if any adjustments to the deposited or fused layer(s) are desirable. If the controller determines one or more adjustments to the deposited or fused layer(s) are desirable, the method further includes communicating commands to the AM printer to institute the one or more adjustments to the deposited or fused layer(s) prior to depositing or fusing all layers of the plurality of layers of the 3D object. The communication of these commands, for example, can be after the measurement and processing of the data from one or more layers occurs. The commands can include updating the instructions for a subsequent layer and/or applying a dedicated correction process, among others known to those skilled in the art in view of the present disclosures. Further, different process control techniques can occur on different timescales. For example, a closed loop control of melt pool parameters, as provided for herein, can happen in real time, while updating scan parameters for a current layer using only data from the previous layer(s) can happen on any timescale, e.g., the process can wait for computation to finish.

Various commands can be communicated to the AM printer to institute the adjustment(s) to the deposited or fused layer(s) prior to depositing or fusing all layers of the plurality of layers of the 3D object. By way of non-limiting example, in some embodiments, the communicating step can include adjusting at least one of a scan speed, a laser power, a laser scan path, a spot size, or a rate of heating or cooling a material of the deposited or fused layer(s). Likewise, various parameters can be measured, and thus, non-limiting examples of the one or more measured parameters can include at least one of a temperature distribution, emissivity, spectrally resolved radiance measurements, band ratios, radiation transport parameters, or a melt pool shape. In instances in which the measured parameter(s) includes emissivity data, the method can include qualifying the dimensions of the 3D object in view of the emissivity data. In instances in which the measured parameter(s) includes anomalous spectral features, the method can include assessing parameters of a melt pool of the AM printer in view of the anomalous spectral features.

Processing the measured parameter(s) using the controller to determine if any adjustments to the deposited or fused layer(s) are desirable can include at least one of: determining statistical moments of the one or more parameters, extracting at least one of spatial derivatives, temporal derivatives, or spectral derivatives, and processing the respective derivative(s) to generate at least one of a quality control assessment or a process control signal of the deposited or fused layer(s). The statistical moments can include a spatial moment, a temporal moment, and/or a spectral moment, among others, and in such instances, processing can include processing at least one of the spatial moment, the temporal moment, the spectral moment, or the respective derivative(s).

The method can further include performing temperature-emissivity separation on the measured parameter(s), and the measured parameter(s) can include one or more spectrally resolved radiance measurements. For example, when the spectrally resolved radiance measurement(s) includes a first spectrally resolved radiance measurement and a second spectrally resolved radiance measurement, the temperature-emissivity separation can be performed using a two temperature method. By way of alternative example, when the measured parameter(s) includes a spectrally resolved radiance measurement, an in-band emissivity of the 3D object can be designated as an arbitrary value that is identical for a single pair of spectral bands that include the spectrally resolved radiance measurement, and the temperature-emissivity separation can be performed using a grey body method.

The step of communicating commands to the AM printer to institute the adjustment(s) to the deposited or fused layer(s) prior to depositing or fusing all layers of the plurality of layers of the 3D object can include altering one or more laser scan parameters of the AM printer to achieve at least one of a desirable thermal gradient and/or a time derivative temperature within a defined region of the three-dimensional object (i.e., the build surface). Additionally, or alternatively, the step can include selectively re-heating at least a portion of the deposited or fused layer(s) to achieve at least one of a desirable thermal profile, thermal gradient, and/or a time derivative of temperature within a defined region of the three-dimensional object (i.e., the build surface). Achieving a desirable thermal profile can be as simple as heating a portion of the layer to a target temperature, i.e., melting it. Further additionally, or alternatively, the step can include adjusting a temperature of at least one of a melt pool of the AM printer or at least a portion of the deposited or fused layer(s) to alter at least one of a microstructure, residual stress, or surface region of a defined region of the 3D object.

In some embodiments, the step of communicating commands to the AM printer to institute the adjustment(s) to the deposited or fused layer(s) prior to depositing or fusing all layers of the plurality of layers of the 3D object can include adjusting an energy profile of a first laser of the AM printer to maintain a desired temperature gradient about a portion of the deposited or fused layer(s) that is melted by a second laser of the AM printer. Further, in some embodiments, the step of communicating commands to the AM printer to institute the adjustment(s) to the deposited or fused layer(s) prior to depositing or fusing all layers of the plurality of layers of the 3D object can include controlling at least one of a power or a scan pathway of a laser of the AM printer to provide substantially constant temperature along a desired region of a melt pool of the additive manufacturing printer as a beam of the AM printer scans. Still further, in some embodiments, the step of communicating commands to the AM printer to institute the adjustment(s) to the deposited or fused layer(s) prior to depositing or fusing all layers of the plurality of layers of the 3D object can include performing at least one of adaptive feed-forward control or feedback control to adjust an energy profile of one or more process lasers of the AM printer. In some such embodiments, at least one of adaptive feed-forward control or feedback control uses previously recorded process data to perform the control. Additionally, or alternatively, the method can include operating at least one of CAD code or machine code to generate control signals in conjunction with adjusting the energy profile of the process laser(s) of the AM printer.

Communicating commands to the AM printer to institute the adjustment(s) to the deposited or fused layer(s) prior to depositing or fusing all layers of the plurality of layers of the 3D object can include remelting material included as part of the deposited or fused layer(s). In some embodiments, the communicating commands step can include terminating manufacture of the 3D object prior to depositing or fusing all layers of the plurality of layers of the 3D object in response to a defect detected by way of the measured parameter(s). The device that processes image data may also be the device that controls the printer and/or the printer itself. For example, image processing and printer control can both be performed on the same FPGA.

Although embodiments described above and otherwise provided for herein include a controller, the systems, devices, and methods provided for in the present disclosure by no means require a feedback loop configuration in which data (e.g., parameters) that is measured, sensed, or otherwise acquired is subsequently relied upon to operate a controller to take some later action. In some instances, the data can be recorded or otherwise stored while not being actively used. The data can be used at some later point in time, whether for informational purposes, to make long-term assessments related to performance, or for some other reason recognizable by a person skilled in the art, including use in generating inspection reports or generation of a digital twin model.

To that end, in one exemplary embodiment of a system for manufacturing a three-dimensional object, the system includes an additive manufacturing printer that is configured to fuse or deposit a plurality of layers to manufacture a three-dimensional object, and an imaging spectrometer configured to measure one or more parameters while the plurality of layers are fused or deposited by the additive manufacturing printer and transmit one or more signals that correlate to the one or more measured parameters so that one or more measured parameters is recorded. The one or more measured parameters can include at least one of a temperature distribution, emissivity, band ratios, radiation transport characteristics, or a melt pool shape. In some embodiments, the measured parameter(s) can include a first spectrally resolved radiance measurement and a second spectrally resolved radiance measurement. The two measurements can be used in conjunction with performing a temperature-emissivity separation using a two temperature method to recover two temperatures corresponding to the two radiance measurements and a spectrally resolved emissivity. In some other embodiments, the measured parameter(s) can include a spectrally resolved radiance measurement. An in-band emissivity of the three-dimensional object can be designated as an arbitrary value that is identical for a single pair of bands that include the spectrally resolved radiance measurement, and a temperature-emissivity separation can be performed using a grey body method.

The three-dimensional object that is being built can be built in accordance with a build plan. The build plan can include information that can change how the object is built. For example, the build plan can include at least one of a scan speed, a laser power, a laser scan path, a spot size, or a rate of heating or cooling a material being fused or deposited in one or more layers of the plurality of layers. If a build plan is adjusted in view of parameters measured or otherwise obtained by the spectrometer, one or more of the aforementioned aspects of the build plan (e.g., a scan speed, a laser power, a laser scan path, a spot size, or a rate of heating or cooling a material being fused or deposited in one or more layers of the plurality of layers) can be adjusted.

The methods for additive manufacturing can likewise record or otherwise store the data while not actively using it. In one exemplary embodiment of a method for additive manufacturing, the method includes depositing or fusing one or more layers of a plurality of layers of a three-dimensional object, with the depositing or fusing being performed by an additive manufacturing printer, measuring one or more parameters associated with the one or more layers using an imaging spectrometer, and communicating the one or more measured parameters to a storage unit. The measuring of the one or more parameters occurs prior to depositing or fusing all layers of the plurality of layers of the three-dimensional object.

The one or more measured parameters can include at least one of a temperature distribution, emissivity, band ratios, radiation transport characteristics, or a melt pool shape. In some embodiments, the method can include performing temperature-emissivity separation on the one or more measured parameters. In some such embodiments, the measured parameter(s) can include a first spectrally resolved radiance measurement and a second spectrally resolved radiance measurement, and the temperature-emissivity separation can be performed using a two temperature method. In some other such embodiments, the measured parameter(s) can include a spectrally resolved radiance measurement, an in-band emissivity of the three-dimensional object can be designated as an arbitrary value that is identical for a single pair of spectral bands that include the spectrally resolved radiance measurement, and the temperature-emissivity separation can be performed using a grey body method.

The three-dimensional object that is being built can be built in accordance with a build plan. The build plan can include information that can change how the object is built. In some such embodiments, the build plan can include at least one of a scan speed, a laser power, a laser scan path, a spot size, or a rate of heating or cooling a material being fused or deposited in one or more layers of the plurality of layers. The method can then include adjusting the build plan in view of parameters measured or otherwise obtained by the spectrometer. Aspects of the build plan that can be adjusted include a scan speed, a laser power, a laser scan path, a spot size, or a rate of heating or cooling a material being fused or deposited in one or more layers of the plurality of layers.

Adjustments that can be made during the printing process include, by way of non-limiting example: controlling at least one of a power or a scan pathway of a laser of the additive manufacturing printer to provide substantially constant temperature along a desired region of a melt pool of the additive manufacturing printer as a beam of the additive manufacturing printer scans; or performing at least one of adaptive feed-forward control or feedback control to adjust an energy profile of one or more process lasers of the additive manufacturing printer. In instances in which adaptive feed-forward control and/or feedback control is used, at least one of those controls can use previously recorded process data to perform the control.

In another exemplary embodiment of a system of additive manufacturing (AM), the system includes a three-dimensional (3D) printer, an imaging spectrometer, and an information processing device. The system, for instance by way of the 3D printer, is capable of real-time control of scan parameters, such as scan speed, laser power, and spot energy distribution for real-time process control, among other scan parameters. The control can be informed by data measured by the imaging spectrometer and processed by the information processing device.

An exemplary embodiment of a method of fabricating a component using the system provided for in the paragraph directly above can include recording multispectral image data of the AM process, and processing the data using a computational device to extract control signals. The computational device can be, or can be associated with, the information processing device of the system.

The process parameters can be updated in real-time in response to control signals, including but not limited to melt pool temperature distribution, emissivity, band ratios, other radiation transport characteristics, and melt pool shape. In some instances, process parameters such as temperature, emissivity, band ratios, other RT features, and melt pool shape, their statistical moments, and their spatial and temporal derivatives can be extracted and processed for a quality control assessment.

The step of processing the data using a computational device to extract control signals can include a temperature-emissivity separation step. In some embodiments, extracted emissivity data can be used to qualify component dimensions. Anomalous spectral features can be used to assess melt pool contamination, such as oxidation.

An exemplary method of fabricating a component can include using the system provided for above in the paragraph starting, "In another exemplary embodiment of a system of additive manufacturing," the process provided for thereafter in the paragraph starting, "An exemplary embodiment of a method of fabricating a component using the system provided for in the paragraph directly above," and, optionally, one or more of the processes provided for above in the paragraphs starting, "The process parameters can be updated" and "The step of processing the data," as well as altering scan parameters or selective re-heating to achieve a desirable thermal profile and/or thermal gradients and/or time derivatives, manipulating temperature(s) to alter component microstructure, and/or manipulating temperature(s) to alter component residual stresses. Achieving a desirable thermal profile can be as simple as heating a portion of the layer to a target temperature, i.e., melting it. Other methods can include the system in the paragraph referenced earlier in this paragraph, the process referenced earlier in this paragraph, and, optionally, one or more additional processes referenced earlier in this paragraph (i.e., the paragraphs identified with quotation marks in this paragraph), as well as manipulating the energy profile of a per/post heat laser in direct response to process conditions such that a preferential temperature gradient is maintained in the region about the region melted by a second laser.

Still further, other methods can include the system provided for above in the paragraph starting, "In another exemplary embodiment of a system of additive manufacturing," the process provided for thereafter in the paragraph starting, "An exemplary embodiment of a method of fabricating a component using the system provided for in the paragraph directly above," and, optionally, one or more additional processes provided for above in the paragraphs starting, "The process parameters can be updated" and "The step of processing the data," as well as controlling the power or scan rate of a laser on a build surface to give a substantially constant temperature along a desired region of a melt pool of the AM printer as a beam of the AM printer scans, despite variabilities in deposited or fused material, thermal properties of the underlying material, and local temperature fluctuations. In such instances, real-time temperature-based feedback of the laser can enable the reduction of temperature and/or shape fluctuations along a melt track, and/or eliminate overheating along/near edges and corners. Still other methods can include the system in the paragraph referenced earlier in this paragraph, the process referenced earlier in this paragraph, and, optionally, one or more additional processes referenced earlier in this paragraph (i.e., the paragraphs identified with quotation marks in this paragraph), as well adjusting an energy profile of the process laser(s) using a combination of adaptive feed-forward and feedback control using previously recorded process data, optionally in conjunction with CAD and/or machine code to generate control signals.

Other methods can include the system provided for above in the paragraph starting, "In another exemplary embodiment of a system of additive manufacturing," the process provided for thereafter in the paragraph starting, "An exemplary embodiment of a method of fabricating a component using the system provided for in the paragraph directive above," and, optionally, one or more additional processes provided for above in the paragraphs starting, "The process parameters can be updated" and "The step of processing the data," as well generating machine instructions to remediate detected defects, such as by remelting. Still further, other methods can include the system in the paragraph referenced earlier in this paragraph, the process referenced earlier in this paragraph, and, optionally, one or more additional processes referenced earlier in this paragraph (i.e., the paragraphs identified with quotation marks in this paragraph), as well as terminating component fabrication in response to a detected defect.

Although references are made to particular systems and processes above by paragraph number, those references are merely examples of systems and processes that can be used. A person skilled in the art will recognize the many other systems and processes provided for herein, or otherwise derivable from the present disclosures, can also be used in place of the example systems and processes without departing from the spirit of the present disclosure. Reference to a particular system or process is by no means limiting, as the present disclosure provides for many systems and processes that can be used in place of particularly referenced systems and methods.

BRIEF DESCRIPTION OF DRAWINGS

This disclosure will be more fully understood from the following detailed description taken in conjunction with the accompanying drawings, in which:

FIG. 4($a$) is an image of an exemplary embodiment of a melt pool that illustrates a temperature distribution across the melt pool;

FIG. 4($b$) is an image of the melt pool of FIG. 4($a$) that illustrates an emissivity distribution across the melt pool;

FIG. 4($c$) is an image of the melt pool of FIG. 4($a$) that illustrates a measured temperature without temperature-emissivity (TE) separation distribution across the melt pool;

FIG. 4($d$) is an image of the melt pool of FIG. 4($a$) that illustrates an error in measurement with respect to temperature distribution across the melt pool;

FIG. 5 is a schematic illustration of qualitative effects of thermal gradients and cooling rates on a microstructure of metals when performing additive manufacturing, such as when performing additive manufacturing with the system of FIG. 1;

FIG. 6 is a schematic illustration of residual stresses generated from a single selective laser melting (SLM) melt track;

FIG. 7A is a schematic illustration of a top view of normal thermal gradients across a surface of an object being additively manufactured;

FIG. 7B is a schematic illustration of a top view of abnormal gradients resulting from porosity across the surface of the object of FIG. 7A;

FIG. 7C is a schematic illustration of a top view of the object of FIG. 7A, illustrating a porous region identified from the abnormal gradients of FIG. 7B;

FIG. 7D is a schematic illustration of a perspective view of the object of FIG. 7A, illustrating a location and severity of porosity of the object, which can be provided, for example, in an inspection report.

GENERAL DESCRIPTION

Figure 1:
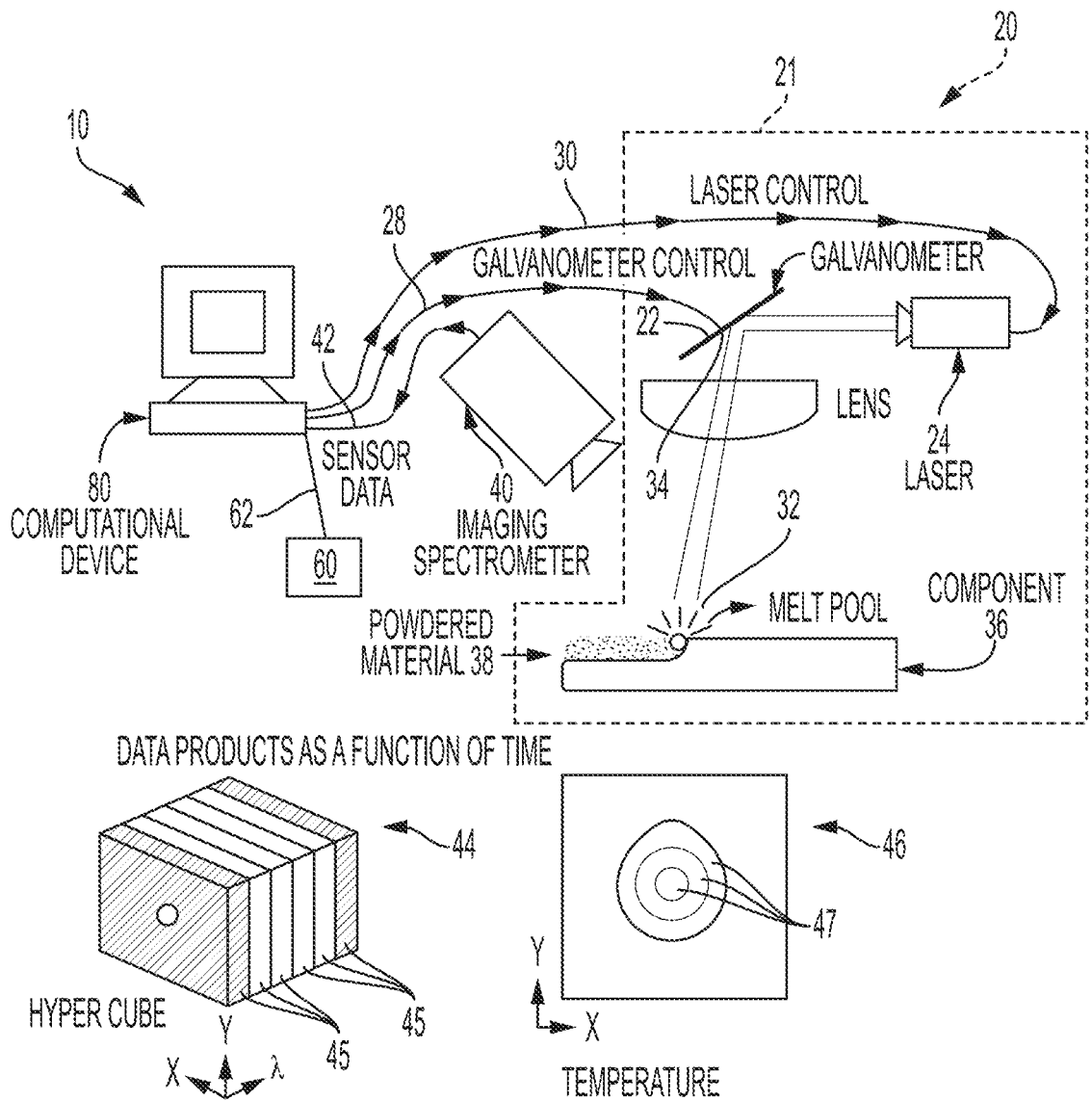
FIG. 1 is a schematic illustration of one exemplary embodiment of a system for manufacturing a three-dimensional object.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. By way of non-limiting example, terms such as "manufacturing" and "printing" may be used interchangeably herein and a person skilled in the art will understand the same. Still further, the present disclosure illustrates some illustrations and descriptions that includes prototypes, bench models, and or schematic illustrations of a set-up. A person skilled in the art will recognize how to rely upon the present disclosure to integrate the techniques, systems, devices, and methods provided for into a product, such as a consumer-ready, factory-ready, or lab-ready three-dimensional printer.

The present disclosure is generally directed to improved additive manufacturing systems, devices, and methods that allow for real-time data gathering and assessment of various parameters associated with the printing. Various parameters and other data can be monitored and recorded and, in some instances, those parameters and/or other data can be utilized to adjust a print plan for the additive manufacturing. Alternatively, or additionally, the recorded parameters and data can be recorded but not actively used, at least not in approximate real-time. The parameters and data can be used for various assessments and other information at a later point in time. The parameters and other data that is measured, determined, or otherwise acquired can be obtained by way of a spectrometer that is operated during the manufacturing process. In some instances, the parameters and other data can be relied upon to determine if any changes are needed to the way printing is occurring (i.e., the build plan). If changes turn out to be desirable, the system is capable of implementing such changes during the manufacturing process. For example, if a defect is identified by the spectrometer data, the system can be operated to reheat one or more layers that were already printed to alter the printed component, removing the defect. The present disclosure provides for other types of changes that can be made, and further, a person skilled in the art, in view of the present disclosure, will understand many different parameters that can be determined and/or acquired, as well as many different actions that can be taken to allow the system to alter the build plan in real-time.

FIG. 1 provides one exemplary embodiment of a system 10 that enables precision process and quality control (PC and QC), with the system including a three-dimensional (3D) printer 20, an imaging spectrometer 40, and a real-time and/or post-processing apparatus or device 60, such as an information processing device, processor, or controller.

The 3D printer can be many different types of printers known to those skilled in the art, including most any type of additive manufacturing (AM) printer. In the illustrated embodiment, the printer 20 is a selective laser melting (SLM) printer that includes a galvanometer 22, a laser 24, a lens 26, a first communication line 28, a second communication line 30, and a melt pool 32. The illustrated embodiment also provides for a housing 21 in which at least some of the components can be provided. In some embodiments, the melt pool, the powdered material, and the component can be part of the housing 21 as shown. For example, the component, and material fused thereto at the melt pool, can be effectively welded to the rest of the printer 20 via a build plate. A person skilled in the art will understand various configurations of 3D printers that are used in conjunction with SLM printing, and thus an image and detailed description of the same is unnecessary. The illustrated embodiment is merely to provide a schematic illustration of how a spectrometer 40 can be used in conjunction with such a printer 20 and other components. Likewise, a person skilled in the art will understand how an SLM printer works, and so the description of the same is provided only in brief below.

As shown, the galvanometer 22 is in communication with a computational device 80 (e.g., a computer, smart phone, etc.) by way of the first communication line 28, and the laser 24 is in communication with the computational device 80 by way of the second communication line 30. The communication lines 28, 30 allow the computational device 80 to communicate with the respective galvanometer 22 and the laser 24. For example, the galvanometer 22 can respond to an electrical current, and can thus convert this electrical signal to rotary motion. The computational device 80 can then scan or direct the laser toolpath by way of turning one or more mirrors 34 attached to the galvanometer rotor axes. The laser 24 can be configured to direct a laser beam towards a mirror 34 associated with the galvanometer 22 for eventual use at the printing site, i.e., at the melt pool 32. As shown, a laser beam 25 can be provided by the laser 24, deflected by the mirror 34, pass through the lens 26 to better focus the laser beam 25 at the intended target, and directed at the melt pool 32. In response, the melt pool 32 may melt to allow the material of the melt pool 32 to be formed into the desired three-dimensional component 36 being manufactured. The feedstock to be fused to the component may be delivered as a powder or powdered material 38, as shown towards the left, top portion of the melt pool 32 of FIG. 1. A person skilled in the art will appreciate that while the communication lines 28, 30 are shown as providing a hard-wire between the computational device 80 and each of the galvanometer 22 and the laser 24, in other embodiments such communication be achieved wireless and/or by other mechanisms and means known to those skilled in the art for transmitting data, signals, information, etc. (e.g., optical). Further, although the present illustration shows a single laser 24 and single laser beam 25, a plurality of lasers and/or laser beams is possible.

The imaging spectrometer 40 also communicates with the computational device 80 by way of a communication line 42. Similar to the communication lines 28, 30, communication between the imaging spectrometer 40 and the computational device 80 can be achieved in other manners known to those skilled in the art, including but not limited to wireless transmission. Transmissions between the imaging spectrometer 40 and the computational device 80 can typically be data and other information sensed or otherwise acquired by the spectrometer 40. The spectrometer 40 can produce a hypercube 44, which provides data as a function of both spatial position in the scene (X and Y) and a third dimension that resolves wavelength ($\lambda$). Each band 45 illustrated in the hypercube can be a different color to demonstrate temperatures (e.g., red, orange, yellow, green, blue, violet). These data may be processed to extract other data products, such as a temperature profile 46, which may be used for direction control of the AM process, as described in greater detail below. The illustrated temperature profile can likewise have different color bands 47, such as yellow most central, then orange, and then red, although other colors and combinations are possible. The illustrated hypercube 44 and temperature profile 46 demonstrate data that may result from measurements made by the spectrometer, and are merely provided for demonstrative purposes. Thus, no discussion of the illustrated results is needed, particularly because a person skilled in the art will understand how to read and extract the desired information from the hypercube and temperature profile. Further, discussions of the many types of parameters the spectrometer 40 can measure, and how those parameters can be stored and/or utilized, are provided for below. Parameters that can be measured by the spectrometer include but are not limited to one or more of a temperature distribution, emissivity, band ratios, radiation transport characteristics, and a melt pool shape. Additional details about such parameters are provided herein, or are otherwise understood by a person skilled in the art in view of the present disclosures. In some instances, the parameters can be sufficient to allow the controller 60 to detect one or more defects in the plurality of fused or deposited layers, and the controller 60 can be configured to adjust the build plan such that at least one defect of the one or more defects is remediated by the controller 60 adjusting the build plan to allow for a portion of the plurality of fused or deposited layers to remelt material included as part of the portion of the plurality of fused or deposited layers. The controller 60, or some other component of the system 10, can be configured to perform at least one of the following as part of remediation: use one or more recovered control signals to quantify defect morphology; deliver extra feedstock to the defect location; calculate optimal scan parameters in view of defect and feedstock properties; or apply one or more scan parameters to the build plan.

Parameters and other data measured or otherwise acquired by the spectrometer 40 can be recorded in a storage unit (e.g., computer, database, cloud, etc.) using any number of techniques known to those skilled in the art for recording, such as storing it in a computer hard drive, a database, in a cloud setting, incorporated into an inspection report, and/or used to generate a digital twin model.

The post-processing apparatus or device 60 is merely illustrated as a box in communication with the computational device 80 via a communication line 62 because a person skilled in the art will recognize may different types of post-processing apparatuses and devices that can be used in conjunction with the present disclosure. Like the other communication lines provided for herein, the communication line 62 is merely representative of communication that can occur between the post-processing apparatus 60 and the computational device 80. Other means of communication (e.g., wireless, optical, etc.) can be relied upon. A person skilled in the art, in view of the present disclosures, will be able to understand the types, configurations, and set-ups for any real-time and/or post-processing apparatuses that are used in conjunction with the provided for systems, devices, and methods. Some exemplary real-time and/or post-processing apparatuses are information processing devices, including processors or controllers, that are able to make adjustments to the build in response to information gathered by the spectrometer. The functionality and capabilities of such processors and controllers is provided in greater detail below (e.g., process control microstructure control, and many others). Other post-processing apparatuses or devices can include those that can actually modify the component 36 being manufactured. Some other non-limiting examples of post-processing apparatuses or devices that can be used in conjunction with the present disclosures include: hot isostatic pressing, to mitigate measured porosity; targeted heat treatment, to mitigate measured excessive residual stress; and/or post machining, to mitigate measured geometric (form) errors.

The controller 60 can be configured to determine statistical moments of the of the parameters measured by the spectrometer 40. Alternatively, or additionally, the controller 60 can also be configured to extract at least one of spatial derivatives or temporal derivatives and process such derivative(s) to generate a quality control assessment and/or a process control signal. Such assessments and signals are discussed in greater detail below. The statistical moments can include averages and/or variance, with the averages and/or variance being along one or more of a spatial, temporal, or spectral dimensions of recorded data. Statistical moments can include one or more of a spatial moment, a temporal moment, and a spectral moment. The controller 60 can be configured to perform temperature-emissivity separation on the measured parameter(s) (e.g., a first spectrally resolved radiance measurement and a second spectrally resolved radiance measurement) by using a two temperature method. Alternatively, the controller 60 can be configured to perform temperature-emissivity separation on the measured parameters (e.g., by assuming constant emissivity across a single pair of spectral bands that include a spectrally resolved radiance measurement) by using a grey body method. Both methods are described in greater detail herein.

A variety of other capabilities of the controller 60 are possible. For example, the controller 60 can be configured to qualify the dimensions of the component 36 being printed in view of emissivity data that is measured by the spectrometer 40. By way of further example, the controller 60 can be configured to assess parameters of the melt pool 32 in view of anomalous spectral features measured by the spectrometer 40.

Although the present disclosure primarily discusses one form of AM printing, SLM printing, a person skilled in the art will understand how the disclosures provided for herein can be applied to other forms of 3D printing as well, thus allowing for PC and QC during other types of 3D printing (e.g., electron beam additive manufacturing (EBM), selective laser sintering (SLS), selective laser melting, fused deposition modeling (FDM), fused filament fabrication, other forms of depositing or fusing by melting, use of chemical reactions, etc.). Further, any number of imaging spectrometers that can be used in conjunction with the present disclosures, including but not limited to spectrometers. To the extent any adaptations or modifications for such spectrometers are desired, a person skilled in the art, in view of the present disclosures, will be able to make such adaptations and modifications. Typically, such adaptations and modifications are not necessary. The operating principles, data processing, and AM work flows integral to the system of FIG. 1, and other provided for systems, devices, and methods, are detailed below.

Adjustments to build plans are described below. In some instances, the controller 60 can effect those adjustments. Alternatively, the computational device 80 can do so. Some non-limiting examples of such adjustments include: adjusting an energy profile of a first laser of the AM printer 20 to maintain a desired temperature gradient about a portion of one or more lasers of the plurality of lasers that is melted by a second laser of the AM printer; a power and/or a scan pathway of a laser of the AM printer 20 to provide a substantially constant temperature along a desired region of the melt pool 32 as a beam of the AM printer scans; adjusting an energy profile of one or more process lasers 24 of the AM printer 20 using at least one of adaptive feed-forward control or feedback control; adjusting the energy profile of the one or more process lasers 24 of the AM printer 20 using previously recorded process data; and/or adjusting the energy profile of the one or more process lasers 24 of the AM printer 20 in conjunction with at least one of a CAD code or an analysis of corresponding machine code to generate control signals. The controller can be configured to terminate manufacture of the component 36 prior to completion of the build plan in response to a defect detected by way of one or more of the parameters measured by the spectrometer 40. Non-limiting examples of energy profiles can include energy delivered as a function of location within the laser spot, which may incorporate Gaussian, quasi-Gaussian, top-hat, or donut character.

Signals of Interest

A great number of radiation transport (RT) phenomena are capable of generating data with a unique spectral signature as a result of a 3D printing process. The application of multispectral sensing to the blackbody radiation emitted by an object is detailed below. However, spatially and spectrally resolved data may extract actionable control and defect detection signals from at least the following processes:

- Spectrally resolved reflectance or transmission of the build material, including when illuminated with an external source;
- Raman spectroscopy, which may prove useful in assessment of de-alloying or contamination;
- Selective emissions (i.e., emissions occurring at a sharp spectral peak), especially in SLM and EBM processes;
- Band ratios of selective emissions;
- Absorption measurements, specifically of the plume generated by the beam-material interaction in SLM or EBM processes; and
- Combinations of the above.

A person skilled in the art will understand other processes from which spatially and spectrally resolved data may extract actionable control and defect detection signals in view of the present disclosures.

Blackbody Radiation

Figure 2:
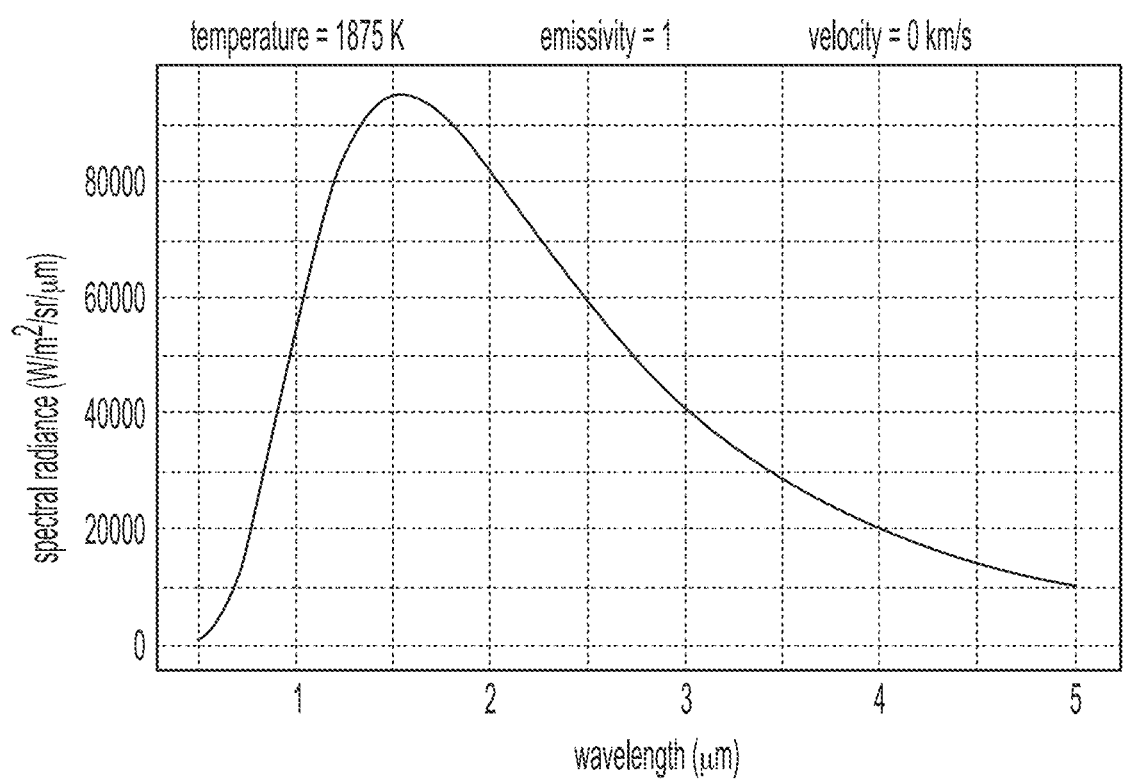
FIG. 2 is a graph illustrating a spectral radiance of a black body for an object at 1875 K.

All objects emit radiation simply as a result of having a non-zero thermodynamic temperature. Light emitted in this manner is known as blackbody radiation. Equation 1a, provided below, yields the radiance of a blackbody ($B_\lambda$) as a function of wavelength ($\lambda$) and temperature (T) by way of physical constants. This function is plotted for an object at 1875 K in FIG. 2. As shown, that radiance is typically a strong function of wavelength. This equation is invertible, meaning if $B_\lambda$ is known for some range of $\lambda$, T can be uniquely determined.

$$B_\lambda(\lambda, T) = \frac{2hc^2}{\lambda^5} \frac{1}{e^{\frac{hc}{\lambda k_b T}} - 1}$$ Equation 1a Materials generally deviate from this idealization. Equation 1b, provided below, includes a multiplicative factor $E(\lambda)$ to describe the efficiency with which a surface undergoes thermal emission or absorption (emissivity of the material). This correction essentially describes the efficiency by which a surface can emit (or by reciprocity, absorb) radiation of a specific wavelength. For certain materials, $E(\lambda)$ may be approximately constant over some range of $\lambda$. These classes of materials are often called grey bodies, and many materials, especially polymers, display this behavior over limited wavelengths.

$$L_\lambda(\lambda, T) = E(\lambda) B_\lambda(\lambda, T)$$ Equation. 1b

Two color pyrometry is an effective method for measuring such materials over limited temperature ranges. In this process, radiance is simultaneously measured in two bands. The emissivity is assumed to be constant over both bands (colors), thus one may determine this value and estimate the temperature of the object. For grey body materials this provides a reasonable assessment of temperature. However, this method struggles when applied across wide temperature ranges, at least because sensing is only optimal when the colors lie along the steep portions of the blackbody curve, and is further compromised when emissivity substantially varies with wavelength. Alternatively, approaches that rely on wide-band image data typically do so in conjunction with an assumed emissivity value to assess temperature of an AM surface or melt pool (described further below). Approaches of this nature, like other existing, deficient approaches, do not rigorously account for the time-varying and spatially-varying optical properties of a build material undergoing processing, and thus are not as effective as the present disclosures.

Most metallic materials deviate greatly even from grey-body behavior. Emissivity of metals typically is a strong function of wavelength, (thermodynamic) phase, surface finish, temperature, and surface contamination. There is also variability even for similar alloys, as is captured for stainless steel alloys in FIG. 3. As shown, at least 23 different stainless steel specimens are charted to demonstrate the correlation between their wavelength and the normal spectral emittance. Variables such as the temperature, surface finish, and degree of oxidation of the specific materials used in the various alloys can have a significant impact on spectral emissivity. However, even if $E(\lambda)$ is a non-constant function, it may still be possible to invert Equation 1a for a radiometric temperature if this dependence is known.

In practice, however, it is nearly impossible to accurately predict the radiative properties of build material in 3D printing processes. In SLM, for example, some powdered build materials initially display near ideal blackbody behavior over spatial length scales that are long as compared to powder particle dimensions. The powder then undergoes a phase change as it melts, thereby becoming mirror-like with low emissivity. The melt pool then solidifies, leaving a rough surface texture of unknown and inexact surface chemistry and geometry, imparting yet another radiative character somewhere between that of the powder and liquid. Other effects present when metals undergo solidification can include segregation, which can cause the radiative properties to change, rapidly, as the temperature of the location of interest changes. Because of this great variance in radiative behavior and unknown distribution thereof, accurate temperature retrieval cannot make use of a-priori knowledge.

Instruments used in the scientific literature and available commercially (see Table 1) either use metrics that do not need to resolve temperature (e.g., simply looking for radiance fluctuations as an indicator of process stability), or make inexact assumptions about the material under interrogation to make purely relative measurements. One common approach is to either use grey body approximation and use an arbitrarily selected emissivity regardless of the condition of the material (e.g., powder, liquid, solid), or ignore the effect entirely and assume blackbody behavior. The results from applying blackbody behavior to typical SLM temperature and emissivity distributions are shown in FIGS. 4(a)-4(d). More particularly, FIGS. 4(a)-4(d) provide for a simulation of an SLM melt pool which illustrates the need for temperature-emissivity (TE) separation to extract accurate radiometric temperature. Specifically, FIGS. 4(a) and 4(b) illustrate temperature and emissivity distributions, respectively, typical of an SLM melt pool. If the emissivity is assumed to be unity, i.e., blackbody behavior, the estimated (measured) temperature distribution is shown in FIG. 4(c). The error in this measurement (essentially values in FIG. 4(a) minus values in FIG. 4(c)) is plotted in FIG. 4(d). The error in temperature estimation is shown to vary with position and approach inaccuracy of up to about 1000 K. Thus, as is clearly evident, ignoring emissivity makes accurate determination of temperature practically impossible via radiometric means.

TABLE 1

Commercially available AM PC/QC modules. Adapted from [6].

| Process | Manufacturer | Module Name | Target Phenomenon | Process Variable | Apparatus |
|---|---|---|---|---|---|
| EBM | Arcam | LayerQam | Porosity | N/A | Camera |
| SLM | Sigma Inc. | PrintRite 3D | Unknown | N/A | Thermocouple and Camera |
| | Concept Laser | QM Melt Pool | Melt Pool Monitoring | Laser Power | High Speed Camera |
| | EOS | N/A | Unknown | N/A | Camera |
| DED | DEMCON | LCC100 | Melt Pool Monitoring | Laser Power | Camera |
| | DM3D Technology | DMD Closed Loop Feedback System | Melt Pool Monitoring and Build Height | Laser Power | 2 Color Pyrometer and 3 High Speed Cameras |
| | Laser Depth | LD-600 | Depth Measurement | Laser Power | Inline Coherent Imaging |
| | Promotec | PD 2000 | Melt Pool Monitoring | N/A | Camera |
| | | PM 7000 | Melt Pool Monitoring | N/A | 1D Photodetector |
| | Stratonics | ThermaViz | Melt Pool Temperature | Laser Power | Two Color Imaging Pyrometer |

Temperature-Emissivity Separation

Temperature-Emissivity (TE) separation, or the process of decoupling the effects of variable spectral emissivity from the temperature of an object given radiometric data, is a difficult process. For example, consider a single thermal radiance measurement comprised of n unique spectral bands on a material of unknown spectral emissivity. It is impossible to invert these measurements for a temperature as the system will always consist of n+1 unknowns: the emissivity of the n bands and the actual temperature T of the object. Thus, neither multispectral or hyperspectral data directly provide a solution to this problem. Rather, the improvements lie in having more spectral bands (colors), thereby ensuring that some portion of the blackbody curve with contrast is always captured, and the ability to perform TE separation using weak assumptions as discussed below.

Performing TE separation on multispectral data relies on breaking the above relations between the number of measurements and unknowns. Two non-limiting examples of TE methods that are suited to the absence of a-priori knowledge and inherent process dynamics inherent to common 3D printing processes include: the two temperature method (TTM) and the grey body method (GBM).

The TTM method relies on making two measurements of the scene at different temperatures, and inverting the resulting 2n radiance measurements to recover n emissivities and two temperatures. A least squares method may be used to solve this overdetermined system. This technique is predicated on emissivity remaining constant between temporally adjacent measurements. For data recorded at high speeds, this may be a reasonable assumption, and the large temperature fluctuations involved in many AM processes make this an effective technique.

A different approximation is made in the GBM. Here, the emissivity is assumed to be an arbitrary but identical value for a single pair of spectral bands, meaning the n measurements are used to recover n−1 emissivities and one temperature. This approximation does not rely on the time correlation necessary with the TTM, and is a particularly good fit if spectral data are finely sampled (small spacing in wavelength between adjacent spectral bins).

With either of these two methods, it is possible to extract an accurate radiometric temperature without knowledge of the exact composition or radiative properties of the subject. As described below, this information may be used to inform AM processes to create parts with superior properties and improved quality assurance.

Process Control

Accurate temperature measurements make high fidelity, in-situ process control possible. Many existing systems rely on either point-thermal measurements that provide an average measurement across the entire melt pool, or rely on wide-band image data to extract approximate melt pool dimensions. The provided for process control techniques described below improve upon existing process control techniques and enable novel processing capabilities.

With the system described herein, laser power, scan speed, laser path, and spot size, among other parameters, may be adjusted in response to an accurately measured temperature spatial profile. Moreover, melt pool shape may be more clearly defined by examining the spectral emissivity for the sharp change in radiative properties between molten and solidified material.

Microstructure Control

High fidelity, high speed measurements of temperature gradients also enable one to control the rate of heating and cooling of build material. As is shown in FIG. 5, which provides for qualitative effects of thermal gradients and cooling rate (labeled as solidification front velocity) on the microstructure of metals, high solidification front velocities or low thermal gradients results in an equiaxed grain structure. Conversely, large thermal gradients or slow solidification front velocity results grains that grow in fractal-like structures called dendrites. These ultimately form elongated columnar grains, which generally grow along the direction of greatest thermal gradient. Increasing the rate of heat flux (in the region about the line denoted high $\dot{T}$) can shrink the characteristic dimensions of the predominate structure, and decreasing the rate of heat flux (in the region about the line denoted low $\dot{T}$) can have the opposite effect. Finally, extremely low solidification front velocities can result in single crystal (plane front solidification) or comparatively few, very large crystals (cells). Knowledge of how the scan parameters can influence the temperature distribution and its rate of change can enable alteration of scan parameters to achieve a desired microstructure such as those described above. This microstructure may be uniform across an entire component, or functionally graded (altered as a function of position) to meet the requirements of a high performance application.

Residual Stress Management

One of the central problems with temperature-based AM processes is the residual stresses that are generated due to the inherently large, non-uniform thermal gradients encountered. The gradients that occur as a result from a single SLM melt track are illustrated in FIGS. 6A and 6B. Specifically, FIG. 6A illustrates the response of a component 600 to heating via exposure to laser radiation 610 in cross section. This locally heats the region 620, resulting in a thermally induced strain (denoted $\varepsilon_{th}$), or thermal expansion. Upon removing the heat source 610, this material solidifies and locally attempts to contract, as shown in FIG. 6B. However, this relaxation is prevented by the rest of the component, meaning the thermally induced strain $\varepsilon_{th}$ is essentially frozen into the heated region 620 of the component. This manifests as the residual stresses $\sigma_{tens}$, a tensile stress in the heated region 620 from this strain, and a reaction stress $\sigma_{comp}$ in the rest of the component 600 that is substantially compressive in character. However, the interaction of many melt tracks and effects of reheating leads to far more complex stress states. Accurate thermal measurements may enable reduction of these thermal gradients, or printing in a fashion that induces favorable residual stresses for a specific application. Compressive residual stresses at the exterior of a component may be generated through preferential preheating of the interior region to mitigate cracking. The interior can be placed in a state of tensile stress as it undergoes greater thermal shrinkage when cooled. At equilibrium, these stresses are countered by compressive stresses at the component's exterior. By way of non-limiting example, such a work flow can include the following steps:

Print layer;

Measure the temperature distribution of the part;

Optionally reheat the part in specific locations if the temperature distribution is not favorable;

Generate toolpaths to scan the next layer to achieve the desired residual stress profile;

Recoat the build platform; and

Repeat until component is complete.

Determination of the optimal thermal profile may be heuristic, informed by computer modeling, and/or experimentally determined. High resolution optical measurement of component boundaries and their movement under cooling comprises a mechanism by which the resulting residual stresses may be verified nondestructively and in-situ.

In view of the present disclosures, the work flow can be altered based on the various parameters measured by the spectrometer, which in turn can cause changes in the build plan for the component being built. When changes occur to the build plan, they will then also impact the work flow. Accordingly, a work flow may also include steps such as measure parameters, store those parameters, and/or adjust the build plan in view of one or more of the measured parameters. The result can be modifying portions of the component that were already printed to fix errors, remediate defects, etc. and/or to add aspects to the component, such as to provide additional support where it is identified to be needed. Aspects of the build plan that can be modified or adjusted include a scan speed, a laser power, a laser scan path, a spot size, and/or a rate of heating or cooling a material being fused or deposited in one or more layers of the plurality of layers of the component.

The build plan can be adjusted in a variety of ways. Some non-limiting examples include: altering one or more laser scan parameters of the AM printer to achieve at least one of a desirable thermal profile, thermal gradient, or a time derivative temperature within a defined region of the component being printed; selectively re-heating at least a portion of at least one layer of the plurality of layers to achieve at least one of a desirable thermal profile, thermal gradient, or a time derivative of temperature within a defined region of the component being printed; and/or adjusting a temperature of at least one of a melt pool of the AM printer or at least a portion of at least one layer of the plurality of layers to alter at least one of a microstructure, residual stress, or surface roughness of a defined region of the component being printed. A defined region can be viewed as any region that is definable by the system or a user thereof, such as a proximal scan vectors, tiles, regions, etc. Achieving a desirable thermal profile can be as simple as heating a portion of the layer to a target temperature, i.e., melting it. A person skilled in the art, in view of the present disclosures, will understand various ways a desirable thermal profile can be achieved. Melting it is merely one option. An optimal profile may or may not need to be so hot as to melt it. Other non-limiting ways by which a build plan can be altered include: (1) measuring during the nominal build process, e.g., information from one layer is used to determine a corrective action, before or during the subsequent layer(s); (2) measuring before the nominal build process, e.g., running a test pattern in the corner of the build area to determine a transformation necessary to the build parameters, and/or a test pattern across the build area to calibrate out machine errors; and/or (3) measuring before the layer is fused or deposited, for instance there could be a pre-layer measurement routine, e.g., inspecting the unfused powder layer for its thermal properties or local anomalies, and correcting the layer-wise build plan accordingly.

Porosity Control

While porosity is typically considered to be a defect, a person skilled in the art may envision a functionally graded component in which porosity is intentionally used to achieve gradients in component density. The systems, devices, and methods described herein are capable of quantitatively assessing porosity over distinct regions, thereby making controlled induction of porosity possible. Methods for inducing porosity include thermally activated gassing agents, dissolution of gas from the melt pool, and keyholing, all of which can benefit from, and arguably demand, precision temperature control. One simple way to affect porosity control can be to tune the laser scan parameters so porosity remains due to incomplete fusion of the powder (at low energy density) or can be generated by application of an excessive energy density, relative to the energy density that causes complete fusion. Moreover, the surface texture, and therefore emissivity, changes rapidly as the material foams (i.e., subsurface pores form due to trapped gas), which can cause difficulties in temperature extraction of the nature noted above.

Feed-Forward Adaptive Control of SLM

Attempts to improve SLM have centered on changing laser power in direct response to melt pool radiance. The present disclosure, on the other hand, provides for improved systems, devices, and methods that not only include feedback control, but also provide for leveraging adaptive feed-forward control to reduce variance in process parameters. Such systems, devices, and methods can use time-temperature profiles (or other spectral data) from nearby scan vectors in the current or previous layers. Consider, for example, the process of printing the first layer of an overhanging feature of a part. As the first scan vector sweeps from printing above previously solidified material to printing above powder, the cooling rate of the melt pool greatly decreases due to the more resistive thermal pathway surrounding the melt pool. Based on measurement of the local temperature gradient, the provided for adaptive controller can switch from parameters optimized for printing in a high-thermal-diffusivity region to those optimized for printing overhanging features. Such adjustment may be performed on a continuous basis throughout the part. The next (parallel and adjacent) scan vector can then be flagged to expect the same change in conditions at approximately the same location along the vector. Likewise, the second layer above the overhang can feature thermal diffusivity somewhere between printing over fused material and over powder. This region is known a-priori from the data of the first layer, again enabling layer-specific or area-specific scan parameters to be computed and fed-forward.

In-Situ Calibration of SLM Scan Parameters

The SLM process may be directly calibrated using a pattern of known, systematically varied laser parameters used to irradiate a designated sub-region of the build platform, prior to fusing the desired component, or during the build process (e.g., when recalibration is desired). Optical interrogation, as described herein, can be used to assess the resulting quality of the scanned regions. The optimal set of scan parameters can then be selected to print the component or part. This pattern may be run once at the beginning of a part, as a continuous witness structure printed every layer, or every few layers as print conditions drift. For instance, the relationships between the scan parameters in the test pattern and the temperature distribution on the build surface, melt pool geometry, etc., can be assessed and used to adjust the scan parameters and/or the scan pattern for the remainder of the build.

Performing this calibration in-situ has a great number of advantages over simple application of a pre-defined recipe. While the latter may be sufficient to select scan parameters under well-controlled conditions (e.g., known layer height and material), not all relevant parameters are generally known to the user of an SLM machine. For example, powder morphology can greatly affect the fusion process, and has been observed to evolve unpredictably as unfused material is recycled and mixed with fresh powder. Performing the calibration as an in-process step allows for optimization of scan parameters in a manner that rigorously accounts for the inaccuracies and unknowns of the machine and material used. Further, the results of this metrology may be used to adjust a nominal process parameter set that is determined by build planning software, and the results of the metrology may be used to update settings in the build planning software.

Compensation for Recoating Faults and Powder Variation

In some embodiments, the recoating process between subsequent layers may result in a substantially perfect uniform layer of powder, from which a layer can be fabricated. However, machine miscalibration or misalignment, changing boundary conditions arising from the nature of the previously fused layer, and/or the stochastic nature of powder particle movement may all manifest as variations in the characteristics of the powder layer across the build platform. This variance can cause defects in complete components, such as porosity resulting from under-fusion in regions of excessive powder deposition.

The present disclosure provides means for quantification and mitigation of such defects, through the ability to discriminate materials based upon their radiative signatures. Here, a multi-spectral image of the build platform can be taken after recoating, optionally after heating to a temperature below that required to fuse the material to enhance blackbody emission. The measured emissivity of each pixel can then be compared to previously measured spectral emissivity functions corresponding to bare, fused material and a deep layer of powdered material. Such a comparison may be performed, for example, by taking the normalized inner product to quantify the degree to which the region subtended by a pixel corresponds to one of these conditions. Regions lacking in powder density can exhibit more radiative character from the prior layer, whereas the radiative character of the powder can dominate where excess powder has been deposited.

These data may be used to alter process parameters, including laser power, spot size, and spot path, such that fluctuations in material properties of the completed article can be minimized. At the most basic level, laser power can be adjusted in a manner corresponding to powder density such that the material is fully melted, while simultaneously preventing excessive vaporization. If large recoating defects are found, the printer can be signaled to re-recoat the layer to improve uniformity.

Quality Control

Existing methods for quality assessment of AM components have centered on detecting temperature anomalies during the build. Mean melt pool temperature excursions can be correlated with component porosity as assessed via computed tomography (CT). However, the point temperature measurements often provide insufficient data, both in terms of accuracy and inability to resolve spatial variations. Thus, prior to the present disclosures, this information did not provide a quantitative metric. There are some methods for optical determination of part porosity that use a wideband sensor to extract thermal diffusivity data. To the extent this information provides a quantitative metric, the methods are generally ineffective due to the limited accuracy of the thermal measurements. Moreover, the averaging techniques employed in such methods only provide a blanket assessment of the entire part, not a localized mapping of component defects as provided for herein. Through extracting superior thermal information, the present disclosures aim to not only improve upon these works, but enable the described novel methods for in-situ quality control.

Dimensional Accuracy

Because the systems, devices, and processes outlined herein extract the emissivity of the scene on a pixel-by-pixel basis, this information may be used to accurately discriminate between powdered and solidified material. In this case, dimensional accuracy of a feature may be optically assessed by looking for the sharp change in emissivity from powder to solid. Geometry fabricated via AM that is inaccessible to conventional machine tools generally implies that it is also inaccessible to conventional metrology (i.e., post-build inspection by coordinate measuring machine). The ability to accurately inspect these features in-situ, before they become inaccessible by subsequent layers, provides an attractive alternative to post-build CT.

Thermal Diffusivity Tomography

Accurate temperature retrieval also enables novel QC methods, such as thermal diffusivity tomography. As illustrated in FIGS. 7A-7D, after printing a layer 510 of a component 500, the process laser(s) (or an alternate means of heating) may be used to induce a thermal gradient in the component 500 at one or more locations without influencing the characteristics of the part (e.g., without causing recrystallization or remelting). Two potential thermal gradients are illustrated in FIGS. 7A and 7B, in which a laser spot 512 is shown on the layer 510, and the gradient is illustrated by various bands 514, which can be different colors based on the temperature gradient (e.g., yellow, then orange, then three shades of red in the provided embodiment). FIG. 7A illustrates a substantially uniform thermal gradient consistent with thermal energy propagating through homogenous material comprising the component. Conversely, FIG. 7B illustrates a distorted thermal gradient, as the porosity serves to locally lower the thermal diffusivity of the component. The resulting gradient can then be measured. In the interior of the part, nonuniformities in the temperature gradient imply voids, cracking, porosity, and other defects. As shown in FIGS. 7B, 7C, and 7D, the component 500 can have a porous region 516. Because data can be collected layer-by-layer, as illustrated by FIG. 7C, an inspection report mapping the exact three-dimensional size and shape of print defects can be computed, for example by stacking the 2D measurements, as best illustrated in FIG. 7D. This process is distinct from typical implementations of thermal diffusivity tomography as a quality assurance measure, wherein experiments must be exclusively performed by heating and observing the exterior of a component.

Defect Remediation

The processes for defect identification described herein provide quantitative methods to detect defects, either in departure from optimal process conditions or by post-layer inspection. This knowledge of defect type and severity is significant for effective remediation before adding subsequent layers to the part. For example, attempting to correct porosity in an SLM part can easily make matters worse if the energy applied vaporizes more build material than volume void removed. Armed with this information, one is able to deterministically repair minor defects in components before they become inaccessible by further material deposition. In one non-limiting example, this process can include the following steps:

Perform in-process quality control;
Assess severity of defects;
Generate toolpaths and process parameters to remediate (e.g., remelt) the area around the defect, either before or after recoating;
Perform remediation; and
Perform in-process quality control to verify defect removal.

The present disclosure provides for many ways by which a build plan can be modified. In some instances, the spectral data can be used to identify voids and/or classify voids the can benefit from remediation. For example, information about pore size, location, and void fraction can be utilized, in conjunction with other knowledge of those skilled in the art (e.g., information about the material that is known), can be used to quantify morphology. This, in turn, can be used to modify the build plan. For example, the system can compute how much energy is needed to deliver material to fill a void without provided excess energy that could cause problems, such as keyholing.

Melt Pool Contamination

Figure 3:
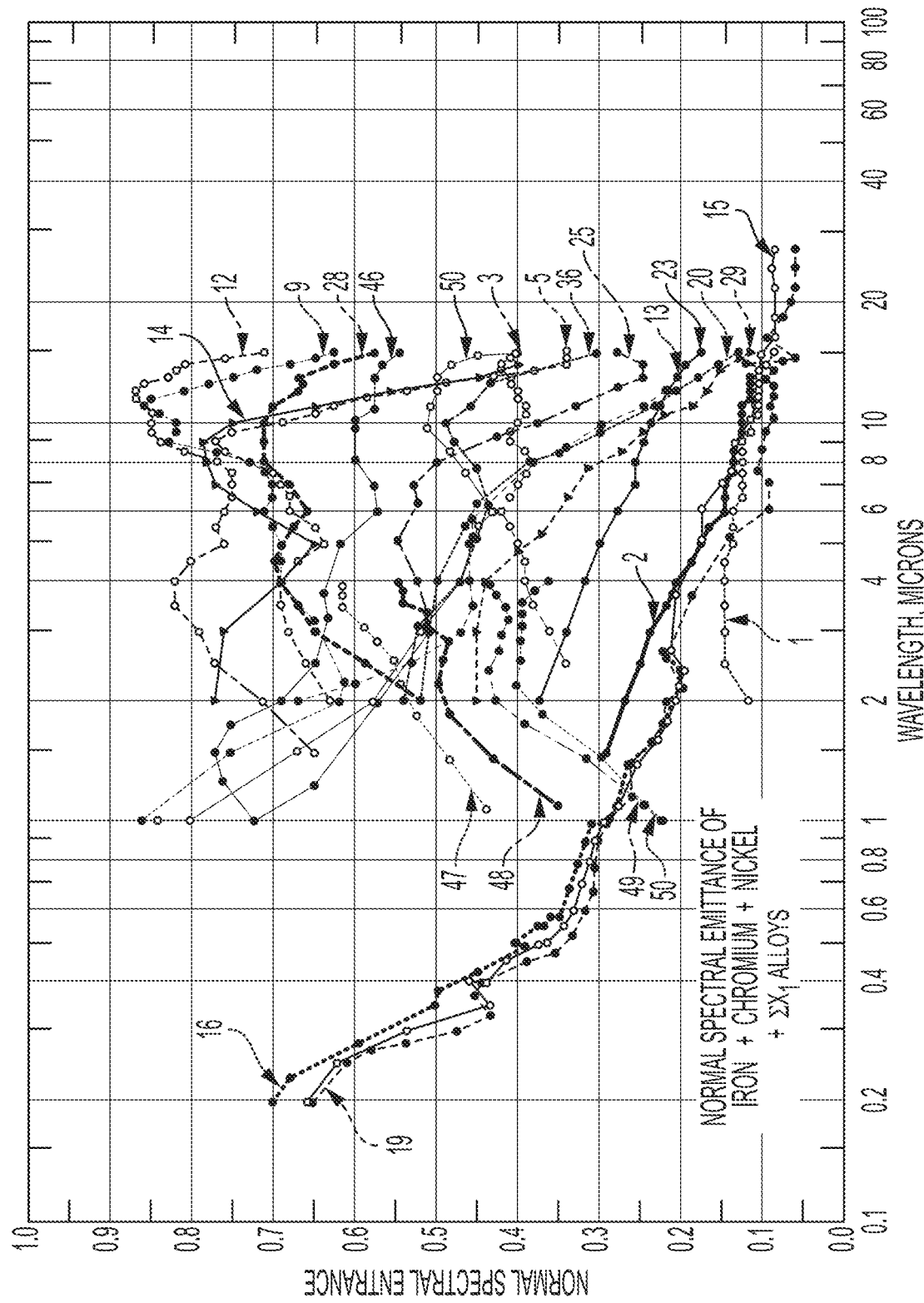
FIG. 3 is a chart illustrating a spectral emittance (emissivity) of a variety of stainless steel compositions having different compositions, temperatures, surface finishes, and degrees of oxidation.

Spectral data also provide means for assessment of melt pool contamination. One of the major drivers of the variability illustrated in FIG. 3 is the presence of surface oxidation. Moreover, selective emission and/or absorption features also leave a spectral fingerprint by which specific contaminants such as oxides or water vapor may be identified. The present disclosures allow for a melt pool to be analyzed by the spectrometer to determine if any contamination has occurred, thereby identifying the issue prior to completion of a build.

Surface Finish

Figure 8:
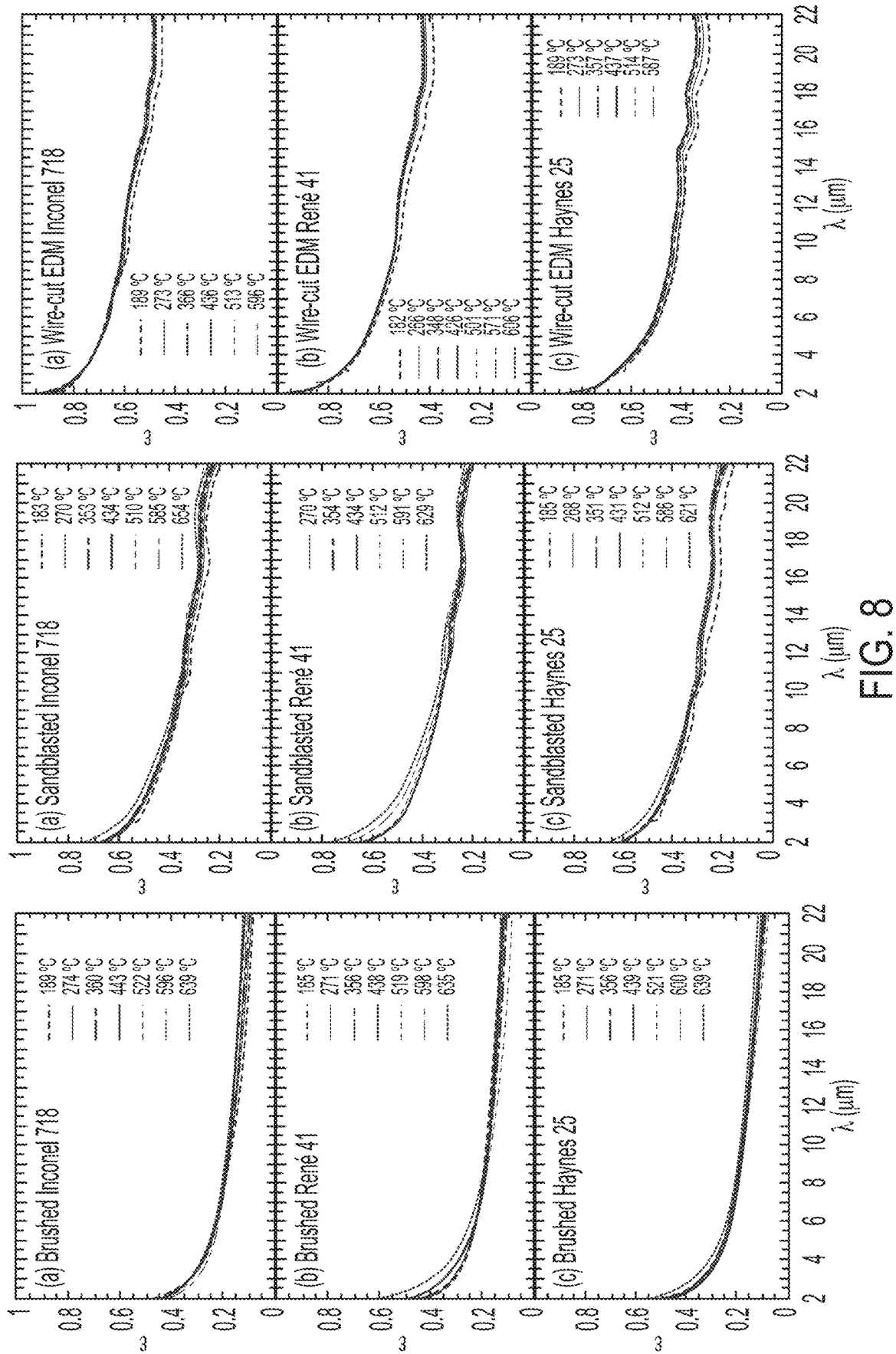
FIG. 8 is a plurality of graphs illustrating spectral emissivities of materials prepared via brushing, sandblasting, and wire electrical discharge machining (EDM) at several temperatures.

Despite greatly complicating temperature retrieval, a spectral emissivity of a component's surface is useful as a PC/QC control parameter in its own right. Abnormalities in surface finish can be indicative of an unstable manufacturing process. Moreover, the ability to measure surface finish provides the means to laser polish favorably oriented surfaces to a controlled level. As an example measurement, FIG. 8 shows clear differences in the spectral emissivity of specimens prepared with a variety of surface finishes. More particularly, three different types of material (Inconel 718, René 41, and Haynes 25) were treated in three different manners (brushed, sandblasted, and wire-cut EDM), and then tested. The treatments in particular demonstrate substantial effects, with sandblasting raising the spectral emissivity of each of the three materials as compared to brushing, and wire-cut EDM producing even higher spectral emissivities than sandblasting. While not strictly representative of surface finishes produced via additive processes (e.g., SLM), these measurements show that surface finish characteristics greatly alter emissivity, or conversely, that emissivity provides a means for interrogating the unknown surface finish of a completed component.

Control of Multi-Laser SLM Apparatus

The introduction of a second process laser (or further additional lasers or beam shapes) can enable higher fidelity thermal management. A person skilled in the art will understand that the impetus for multiple laser machines can be an enlarged build area. Typical implementation is such that the overlap of the scan area between lasers is minimized, and each process laser controls a melt pool completely independent of the other. Conversely, in many instances, the present approach relies on having the overlapping scan area large enough to fully contain the part of interest. This allows for both lasers to work in a coordinated manner to realize a desired spatial and/or temporal thermal profile of the build region.

A non-limiting example configuration uses one laser to provide energy for preheating a region about the melt pool. In such an instances, this laser can bring the material near, without exceeding, its melting point. The second laser then only needs to supply enough energy to melt the material from this elevated temperature, thus reducing the spatial thermal gradient about the melted region.

If the aggregate actions of both lasers are considered, it becomes evident that the laser power and/or energy distribution may need to be altered as a function of time. Energy from the second (melting) laser can diffuse outwards from the melt pool, thereby heating the surrounding material. Thus, the pre/post heat laser intensity can be reduced in response to the thermal energy from the melting laser. Precision thermal monitoring using an imaging spectrometer can enable these parameters to be tuned in direct response to process conditions that may vary greatly with material and build geometry. This approach may be extended to systems with arbitrary numbers of laser spots, having shapes including but not limited to dots or lines, with synchronized or independent control. Also, this may apply to reshaping the intensity profile of a single beam or multiple beams, where each beam may be formed using optics that operate on one or more laser sources.

Comparison to Post-Build Computed Tomography

The primary alternative to precision process control and in-situ quality assessment is post-build computed tomography (CT), which is arguably the industry standard at present for void detection and dimensional verification. CT scanning relies on X-ray radiation to differentiate materials based upon their electron density. Due to the mechanism by which X-ray tubes operate, volumetric resolution is limited to about 5 µm for samples below about 1000 mm$^3$ and falls off proportionately for larger samples. The present disclosure, because it provides an assessment of part quality during the build process, enables defect remediation or termination if an unrecoverable defect is found. Moreover, the present disclosure permits the fabrication and inspection processes to run in parallel, as opposed to requiring a post build inspection requiring many CT machine-hours.

Commercial Applications

The tremendous growth of AM has been driven by the complexity-for-free design paradigm. The ability to fabricate otherwise impossible geometries extends the design space for engineering components, and often allows for replacement of multi-part assemblies with monolithic counterparts. Extending this trend to mission critical applications typically requires stringent process control to ensure the full strength of a component is realized. Although there are existing commercial products that improve the performance and quality assurance of AM components by observing the fabrication process, none have proven adequate to bring additive processes under complete, or near complete, control, nor replace conventional post-build inspection processes.

Demand for advanced PC/QC for additive processes is proven by the add-on modules listed in Table 1 above. While the instrumentation described herein integrates similarly to 3D printing equipment, its improved fidelity and advanced data processing enable closed-loop control over novel additive techniques and increased confidence that the fabricated component performs as specified.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A system for manufacturing a three-dimensional object, comprising:
    an additive manufacturing printer configured to fuse or deposit a plurality of layers to manufacture a three-dimensional object according to a build plan;
    an imaging spectrometer configured to measure one or more parameters while the plurality of layers are fused or deposited by the additive manufacturing printer and transmit one or more signals that correlate to the one or more measured parameters; and
    a controller configured to receive the signals that correlate to the one or more measured parameters, determine if any changes to the build plan are desirable in view of the one or more measured parameters, and, if changes are determined to be desirable, adjust the build plan in view of the one or more measured parameters while the additive manufacturing printer is still in the process of manufacturing the three-dimensional object,
    wherein the controller is configured to receive signals that correlate to the one or more measured parameters from an area of the one or more plurality of layers not actively being fused or deposited by the additive manufacturing printer, and
    wherein the controller is configured to perform temperature-emissivity separation on the one or more measured parameters, and the one or more measured parameters comprises a spectrally resolved radiance measurement, an in-band emissivity of the three-dimensional object is designated as an arbitrary value that is identical for a single pair of spectral bands that include the spectrally resolved radiance measurement, and the temperature-emissivity separation is performed using a grey body method.

2. The system of claim 1,
    wherein the build plan includes at least one of a scan speed, a laser power, a laser scan path, a spot size, or a rate of heating or cooling a material being fused or deposited in one or more layers of the plurality of layers, and
    wherein an adjustment to the build plan by the controller includes at least one of adjusting the scan speed, the laser power, the toolpath, the spot size, or the rate of heating or cooling a material being fused or deposited in one or more layers of the plurality of layers in response to the one or more measured parameters.

3. The system of claim 1, wherein the one or more measured parameters includes at least one of a temperature distribution, emissivity, band ratios, radiation transport characteristics, or a melt pool shape.

4. The system of claim 3,
    wherein the controller is configured to determine statistical moments of the one or more parameters, and
    wherein the controller is configured to extract at least one of spatial derivatives, temporal derivatives, or spectral derivatives, and process the at least one of spatial derivatives or temporal derivatives to generate at least one of a quality control assessment or a process control signal.

5. The system of claim 1, wherein the spectrally resolved radiance measurement comprises a plurality of spectrally resolved radiance measurements, the plurality of spectrally resolved radiance measurements including a first spectrally resolved radiance measurement and a second spectrally resolved radiance measurement, and the temperature-emissivity separation is performed using a two temperature method.

6. The system of claim 1, wherein the one or more measured parameters comprises emissivity data, and the controller is configured to qualify the dimensions of the three-dimensional object in view of the emissivity data.

7. The system of claim 1, wherein an adjustment to the build plan by the controller comprises at least one of the following adjustments:
    altering one or more laser scan parameters of the additive manufacturing printer to achieve at least one of a desirable thermal gradient or a time derivative temperature within a defined region of the three-dimensional object;
    selectively re-heating at least a portion of at least one layer of the plurality of layers to achieve at least one of a desirable thermal profile, thermal gradient, or a time derivative of temperature within a defined region of the three-dimensional object; or
    adjusting a temperature of at least one of a melt pool of the additive manufacturing printer or at least a portion of at least one layer of the plurality of layers to alter at least one of a microstructure, residual stress, or surface roughness of a defined region of the three-dimensional object.

8. The system of claim 1, wherein an adjustment to the build plan by the controller comprises adjusting an energy profile of a first laser of the additive manufacturing printer to maintain a desired temperature gradient about a portion of one or more lasers of the plurality of lasers that is melted by a second laser of the additive manufacturing printer.

9. The system of claim 1, wherein the controller is configured to control at least one of a power or a scan pathway of a laser of the additive manufacturing printer to provide a substantially constant temperature along a desired region of a melt pool of the additive manufacturing printer as a beam of the additive manufacturing printer scans.

10. The system of claim 1, wherein the one or more measured parameters are sufficient to allow the controller to detect one or more defects in the plurality of fused or deposited layers, and the controller is configured to adjust the build plan such that at least one defect of the one or more defects is remediated by the controller adjusting the build plan to allow for a portion of the plurality of fused or deposited layers to remelt material included as part of the portion of the plurality of fused or deposited layers.

11. The system of claim 10, wherein the controller being configured to adjust the build plan such that at least one defect of the one or more defects is remediated by the controller adjusting the build plan to allow for a portion of the plurality of fused or deposited layers to remelt material included as part of the portion of the plurality of fused or deposited layers further comprises the controller being configured to perform at least one of the following:
  use one or more recovered control signals to quantify defect morphology;
  deliver extra feedstock to the defect location;
  calculate optimal scan parameters in view of defect and feedstock properties; or
  apply one or more scan parameters to the build plan.

12. The system of claim 1, wherein the controller is configured to terminate manufacture of the three-dimensional object prior to completion of the build plan in response to a defect detected by way of the one or more measured parameters.

* * * * *